United States Patent
Camargos et al.

(10) Patent No.: US 12,063,270 B2
(45) Date of Patent: *Aug. 13, 2024

(54) COMMISSIONING AND DECOMMISSIONING METADATA NODES IN A RUNNING DISTRIBUTED DATA STORAGE SYSTEM

(71) Applicant: Commvault Systems, Inc., Tinton Falls, NJ (US)

(72) Inventors: Lásaro Camargos, Uberlandia (BR); Deepak Jain, Santa Clara, CA (US); Avinash Lakshman, Fremont, CA (US); Bharat Pundalik Naik, Palo Alto, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,499

(22) Filed: Mar. 30, 2023

(65) Prior Publication Data

US 2023/0308507 A1     Sep. 28, 2023

Related U.S. Application Data

(63) Continuation of application No. 17/465,683, filed on Sep. 2, 2021, now Pat. No. 11,647,075.

(Continued)

(51) Int. Cl.
*G06F 15/173* (2006.01)
*G06F 9/455* (2018.01)
(Continued)

(52) U.S. Cl.
CPC ...... *H04L 67/1046* (2013.01); *G06F 9/45558* (2013.01); *G06F 11/1425* (2013.01);
(Continued)

(58) Field of Classification Search
CPC ............... H04L 67/1046; G06F 16/182; G06F 16/2365; G06F 9/45558; G06F 11/1425
(Continued)

(56) References Cited

U.S. PATENT DOCUMENTS

| 9,875 A | 7/1853 | Burton |
| 4,084,231 A | 4/1978 | Capozzi et al. |

(Continued)

FOREIGN PATENT DOCUMENTS

| EP | 0259912 | 3/1988 |
| EP | 0405926 | 1/1991 |

(Continued)

OTHER PUBLICATIONS

U.S. Appl. No. 16/907,023, filed Jun. 19, 2020, Owen et al.
(Continued)

*Primary Examiner* — Liang Che A Wang
(74) *Attorney, Agent, or Firm* — Commvault Systems, Inc.

(57) ABSTRACT

In a running distributed data storage system that actively processes I/Os, metadata nodes are commissioned and decommissioned without taking down the storage system and without introducing interruptions to metadata or payload data I/O. The inflow of reads and writes continues without interruption even while new metadata nodes are in the process of being added and/or removed and the strong consistency of the system is guaranteed. Commissioning and decommissioning nodes within the running system enables streamlined replacement of permanently failed nodes and advantageously enables the system to adapt elastically to workload changes. An illustrative distributed barrier logic (the "view change barrier") controls a multi-state process that controls a coordinated step-wise progression of the metadata nodes from an old view to a new normal. Rules for (Continued)

I/O handling govern each state until the state machine loop has been traversed and the system reaches its new normal.

20 Claims, 12 Drawing Sheets

Related U.S. Application Data

(60) Provisional application No. 63/082,624, filed on Sep. 24, 2020, provisional application No. 63/082,631, filed on Sep. 24, 2020, provisional application No. 63/081,503, filed on Sep. 22, 2020.

(51) Int. Cl.

| | | |
|---|---|---|
| *G06F 11/14* | (2006.01) | |
| *G06F 16/182* | (2019.01) | |
| *G06F 16/23* | (2019.01) | |
| *G06F 18/25* | (2023.01) | |
| *G06V 10/25* | (2022.01) | |
| *G06V 10/34* | (2022.01) | |
| *G06V 20/54* | (2022.01) | |
| *G06V 20/59* | (2022.01) | |
| *G06V 40/10* | (2022.01) | |
| *H04L 67/104* | (2022.01) | |
| *H04N 7/18* | (2006.01) | |
| *H04N 23/56* | (2023.01) | |
| *H04N 23/66* | (2023.01) | |

(52) U.S. Cl.
CPC ........ *G06F 16/182* (2019.01); *G06F 16/2365* (2019.01); *G06F 18/251* (2023.01); *G06V 10/25* (2022.01); *G06V 10/34* (2022.01); *G06V 20/54* (2022.01); *G06V 20/59* (2022.01); *G06V 40/10* (2022.01); *G06V 40/103* (2022.01); *H04L 67/1048* (2013.01); *H04N 7/181* (2013.01); *H04N 7/188* (2013.01); *H04N 23/56* (2023.01); *H04N 23/66* (2023.01); *G06F 2009/45583* (2013.01); *G06V 2201/08* (2022.01)

(58) Field of Classification Search
USPC ................................................ 709/223, 226
See application file for complete search history.

(56) References Cited

U.S. PATENT DOCUMENTS

| | | | |
|---|---|---|---|
| 4,267,568 A | 5/1981 | Dechant et al. | |
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,107,298 B2 | 9/2006 | Prahlad et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,734,669 B2 | 6/2010 | Kottomtharayil et al. | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,612,439 B2 | 12/2013 | Prahlad et al. | |
| 8,700,754 B2 * | 4/2014 | Riley ..................... | H04L 41/12 340/870.02 |
| 8,706,867 B2 | 4/2014 | Vijayan | |
| 8,805,971 B1 * | 8/2014 | Roth ..................... | G06F 9/5072 709/220 |
| 8,950,009 B2 | 2/2015 | Vijayan et al. | |
| 8,954,446 B2 | 2/2015 | Vijayan Retnamma et al. | |
| 9,020,900 B2 | 4/2015 | Vijayan Retnamma et al. | |
| 9,021,282 B2 | 4/2015 | Muller | |
| 9,098,495 B2 | 8/2015 | Gokhale | |
| 9,116,633 B2 | 8/2015 | Sancheti et al. | |
| 9,171,008 B2 | 10/2015 | Prahlad | |
| 9,189,170 B2 | 11/2015 | Harakhchand et al. | |
| 9,239,687 B2 | 1/2016 | Vijayan et al. | |
| 9,262,496 B2 | 2/2016 | Kumarasamy et al. | |
| 9,286,110 B2 | 3/2016 | Mitkar et al. | |
| 9,311,121 B2 | 4/2016 | Deshpande et al. | |
| 9,378,035 B2 | 6/2016 | Kripalani | |
| 9,411,534 B2 | 8/2016 | Lakshman et al. | |
| 9,424,151 B2 | 8/2016 | Lakshman et al. | |
| 9,451,023 B2 | 9/2016 | Sancheti et al. | |
| 9,461,881 B2 | 10/2016 | Kumarasamy et al. | |
| 9,483,205 B2 | 11/2016 | Lakshman et al. | |
| 9,495,404 B2 | 11/2016 | Kumarasamy et al. | |
| 9,558,085 B2 | 1/2017 | Lakshman et al. | |
| 9,633,033 B2 | 4/2017 | Vijayan et al. | |
| 9,639,274 B2 | 5/2017 | Maranna et al. | |

(56) References Cited

U.S. PATENT DOCUMENTS

| | | | |
|---|---|---|---|
| 9,641,388 B2 | 5/2017 | Kripalani et al. | |
| 9,710,465 B2 | 7/2017 | Dornemann et al. | |
| 9,798,489 B2 | 10/2017 | Lakshman et al. | |
| 9,864,530 B2 | 1/2018 | Lakshman | |
| 9,875,063 B2 | 1/2018 | Lakshman | |
| 9,983,936 B2 | 5/2018 | Dornemann et al. | |
| 10,042,716 B2 | 8/2018 | Nallathambi et al. | |
| 10,067,722 B2 | 9/2018 | Lakshman | |
| 10,084,873 B2 | 9/2018 | Dornemann | |
| 10,162,528 B2 | 12/2018 | Sancheti et al. | |
| 10,210,048 B2 | 2/2019 | Sancheti | |
| 10,228,962 B2 | 3/2019 | Dornemann et al. | |
| 10,248,174 B2 | 4/2019 | Lakshman et al. | |
| 10,248,657 B2 | 4/2019 | Prahlad et al. | |
| 10,264,074 B2 | 4/2019 | Vijayan et al. | |
| 10,296,368 B2 | 5/2019 | Dornemann et al. | |
| 10,310,953 B2 | 6/2019 | Vijayan et al. | |
| 10,311,150 B2 | 6/2019 | Bansod et al. | |
| 10,346,259 B2 | 7/2019 | Gokhale et al. | |
| 10,379,598 B2 | 8/2019 | Muller | |
| 10,387,266 B2 | 8/2019 | Kumarasamy et al. | |
| 10,417,102 B2 | 9/2019 | Sanakkayala et al. | |
| 10,592,153 B1 | 3/2020 | Subramaniam et al. | |
| 10,592,350 B2 | 3/2020 | Dornemann | |
| 10,776,329 B2 | 3/2020 | Polimera et al. | |
| 10,613,939 B2 | 4/2020 | Mitkar et al. | |
| 10,664,352 B2 | 5/2020 | Rana | |
| 10,678,758 B2 | 6/2020 | Dornemann | |
| 10,684,924 B2 | 6/2020 | Kilaru et al. | |
| 10,691,187 B2 | 6/2020 | Lakshman | |
| 10,691,666 B1 | 6/2020 | McDowell et al. | |
| 10,732,885 B2 | 8/2020 | Gutta et al. | |
| 10,740,193 B2 | 8/2020 | Dhatrak | |
| 10,740,300 B1 | 8/2020 | Lakshman et al. | |
| 10,747,630 B2 | 8/2020 | Sanakkayala et al. | |
| 10,768,971 B2 | 9/2020 | Dornemann et al. | |
| 10,776,209 B2 | 9/2020 | Pawar et al. | |
| 10,795,577 B2 | 10/2020 | Lakshman et al. | |
| 10,846,024 B2 | 11/2020 | Lakshman et al. | |
| 10,848,468 B1 | 11/2020 | Lakshman et al. | |
| 10,853,195 B2 | 12/2020 | Ashraf et al. | |
| 10,877,928 B2 | 12/2020 | Nagrale et al. | |
| 10,891,198 B2 | 1/2021 | Nara et al. | |
| 10,917,471 B1 | 2/2021 | Karumbunathan et al. | |
| 10,949,308 B2 | 3/2021 | Krishnan | |
| 11,099,956 B1 | 8/2021 | Polimera et al. | |
| 11,106,632 B2 | 8/2021 | Bangalore et al. | |
| 11,113,246 B2 | 9/2021 | Mitkar et al. | |
| 11,314,687 B2 | 4/2022 | Kavaipatti Anantharamakrishnan et al. | |
| 11,327,663 B2 | 5/2022 | Bhagi | |
| 11,340,672 B2 | 5/2022 | Lakshman | |
| 11,442,896 B2 | 9/2022 | Agrawal | |
| 11,570,243 B2 | 1/2023 | Camargos | |
| 11,647,075 B2 | 5/2023 | Camargos | |
| 11,789,830 B2 | 10/2023 | Jain | |
| 2005/0251522 A1* | 11/2005 | Clark | G06F 16/10 |
| 2006/0224846 A1 | 10/2006 | Amarendran et al. | |
| 2009/0319534 A1 | 12/2009 | Gokhale | |
| 2012/0150818 A1 | 6/2012 | Vijayan Retnamma et al. | |
| 2012/0150826 A1 | 6/2012 | Vijayan Retnamma et al. | |
| 2013/0036092 A1 | 2/2013 | Lafont et al. | |
| 2014/0052706 A1 | 2/2014 | Misra | |
| 2014/0196038 A1 | 7/2014 | Kottomtharayil et al. | |
| 2014/0201140 A1 | 7/2014 | Vibhor et al. | |
| 2014/0201157 A1 | 7/2014 | Pawar et al. | |
| 2014/0201170 A1 | 7/2014 | Vijayan et al. | |
| 2014/0310706 A1* | 10/2014 | Bruso | G06F 9/45533 718/1 |
| 2015/0074536 A1 | 3/2015 | Varadharajan et al. | |
| 2016/0100013 A1 | 4/2016 | Vijayan et al. | |
| 2016/0142485 A1 | 5/2016 | Mitkar et al. | |
| 2016/0350302 A1 | 12/2016 | Lakshman | |
| 2016/0350391 A1 | 12/2016 | Vijayan et al. | |
| 2017/0126807 A1 | 5/2017 | Vijayan et al. | |
| 2017/0168903 A1 | 6/2017 | Dornemann et al. | |
| 2017/0185488 A1 | 6/2017 | Kumarasamy et al. | |
| 2017/0192866 A1 | 7/2017 | Vijayan et al. | |
| 2017/0193003 A1 | 7/2017 | Vijayan et al. | |
| 2017/0235647 A1 | 8/2017 | Kilaru et al. | |
| 2017/0242871 A1 | 8/2017 | Kilaru et al. | |
| 2017/0302588 A1* | 10/2017 | Mihailovici | G06F 9/5077 |
| 2018/0048556 A1 | 2/2018 | Chen et al. | |
| 2018/0276085 A1 | 9/2018 | Mitkar et al. | |
| 2018/0285202 A1 | 10/2018 | Bhagi | |
| 2018/0285205 A1 | 10/2018 | Mehta et al. | |
| 2018/0285383 A1 | 10/2018 | Nara et al. | |
| 2018/0375938 A1 | 12/2018 | Vijayan et al. | |
| 2019/0050421 A1 | 2/2019 | Saxena | |
| 2019/0068464 A1 | 2/2019 | Bernat et al. | |
| 2019/0109713 A1 | 4/2019 | Clark et al. | |
| 2019/0179805 A1 | 6/2019 | Prahlad et al. | |
| 2019/0182325 A1 | 6/2019 | Vijayan et al. | |
| 2019/0278662 A1 | 9/2019 | Nagrale et al. | |
| 2019/0303246 A1 | 10/2019 | Gokhale et al. | |
| 2019/0332294 A1* | 10/2019 | Kilari | G06F 3/0671 |
| 2020/0034248 A1 | 1/2020 | Nara et al. | |
| 2020/0073574 A1 | 3/2020 | Pradhan | |
| 2020/0233845 A1 | 7/2020 | Dornemann et al. | |
| 2020/0241613 A1 | 7/2020 | Lakshman et al. | |
| 2020/0250041 A1 | 8/2020 | Wan | |
| 2020/0278915 A1 | 9/2020 | Degaonkar et al. | |
| 2020/0319694 A1 | 10/2020 | Mohanty et al. | |
| 2020/0341871 A1 | 10/2020 | Shveidel | |
| 2020/0349027 A1 | 11/2020 | Bansod et al. | |
| 2020/0394110 A1 | 12/2020 | Ramohalli Gopala Rao et al. | |
| 2020/0401489 A1 | 12/2020 | Mitkar et al. | |
| 2021/0034468 A1 | 2/2021 | Patel | |
| 2021/0049079 A1 | 2/2021 | Kumar et al. | |
| 2021/0064484 A1 | 3/2021 | Dornemann et al. | |
| 2021/0075768 A1 | 3/2021 | Polimera et al. | |
| 2021/0089215 A1 | 3/2021 | Ashraf et al. | |
| 2021/0173744 A1 | 6/2021 | Agrawal et al. | |
| 2021/0200648 A1 | 7/2021 | Clark | |
| 2021/0209060 A1 | 7/2021 | Kottomtharayil et al. | |
| 2021/0218636 A1 | 7/2021 | Parvathmvenkatas et al. | |
| 2021/0255771 A1 | 8/2021 | Kilaru et al. | |
| 2021/0271564 A1 | 9/2021 | Mitkar et al. | |
| 2021/0286639 A1 | 9/2021 | Kumar | |
| 2021/0357246 A1 | 11/2021 | Kumar et al. | |
| 2022/0103622 A1 | 3/2022 | Camargos et al. | |
| 2022/0214997 A1 | 7/2022 | Kavaipatti Anantharamakrishnan et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |
| WO | WO2016/004120 | 1/2016 |

OTHER PUBLICATIONS

U.S. Appl. No. 17/120,555, filed Dec. 14, 2020, Chatterjee et al.
U.S. Appl. No. 17/153,667, filed Jan. 20, 2021, Naik et al.
U.S. Appl. No. 17/153,674, filed Jan. 20, 2021, Lakshman.
U.S. Appl. No. 17/165,266, filed Feb. 2, 2021, Nara et al.
U.S. Appl. No. 17/179,160, filed Feb. 18, 2021, Kavaipatti Anantharamakrishnan.
U.S. Appl. No. 17/336,103, filed Jun. 1, 2021, Vastrad et al.
U.S. Appl. No. 17/354,905, filed Jun. 22, 2021, Rana et al.
U.S. Appl. No. 17/389,204, filed Jul. 29, 2021, Mahajan et al.
U.S. Appl. No. 17/465,683, filed Sep. 2, 2021, Camargos et al.
U.S. Appl. No. 17/465,722, filed Sep. 2, 2021, Jain et al.
U.S. Appl. No. 17/494,702, filed Oct. 5, 2021, Polimera et al.
U.S. Appl. No. 17/501,881, filed Oct. 14, 2021, Dornemann et al.

(56) References Cited

OTHER PUBLICATIONS

U.S. Appl. No. 17/508,822, filed Oct. 22, 2021, Mutha et al.
U.S. Appl. No. 17/526,927, filed Nov. 15, 2021, Kapadia et al.
Seto, Christ, "Why Deploying on Kubernetes is Like Flying With an Alligator," Cockroach Labs (https://www.cockroachlabs.com/blog/kubernetes-scheduler/), dated Feb. 9, 2021, retrieved on Mar. 8, 2021, in 8 pages.
Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.
Lakshman et al., "Cassandra—A Decentralized Structured Storage System", https://doi.org/10.1145/1773912.1773922, ACM SIGOPS Operating Systems Review, Volum 44, Issue 2, Apr. 2010, pp. 35-40.
NetApp, StorageGRID 11.3 documentation, "Recovery and Maintenance Guide", published Jan. 2020. Accessed Sep. 2022.
SwiftStack, Inc., The OpenStack Object Storage System, Feb. 2012, pp. 1-29.
Zhou et al, A highly Reliable Metadata Service for Large-Scale Distributed File systems IEEE.
U.S. Appl. No. 63/081,503, filed Sep. 22, 2020, Jain et al.
U.S. Appl. No. 63/082,624, filed Sep. 24, 2020, Camargos et al.
U.S. Appl. No. 63/082,631, filed Sep. 24, 2020, Lakshman et al.
Armstead et al., "Implementation of a Campus-wide Distributed Mass Storage Service: The Dream vs. Reality," IEEE, Sep. 11-14, 1995, pp. 190-199.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.

\* cited by examiner

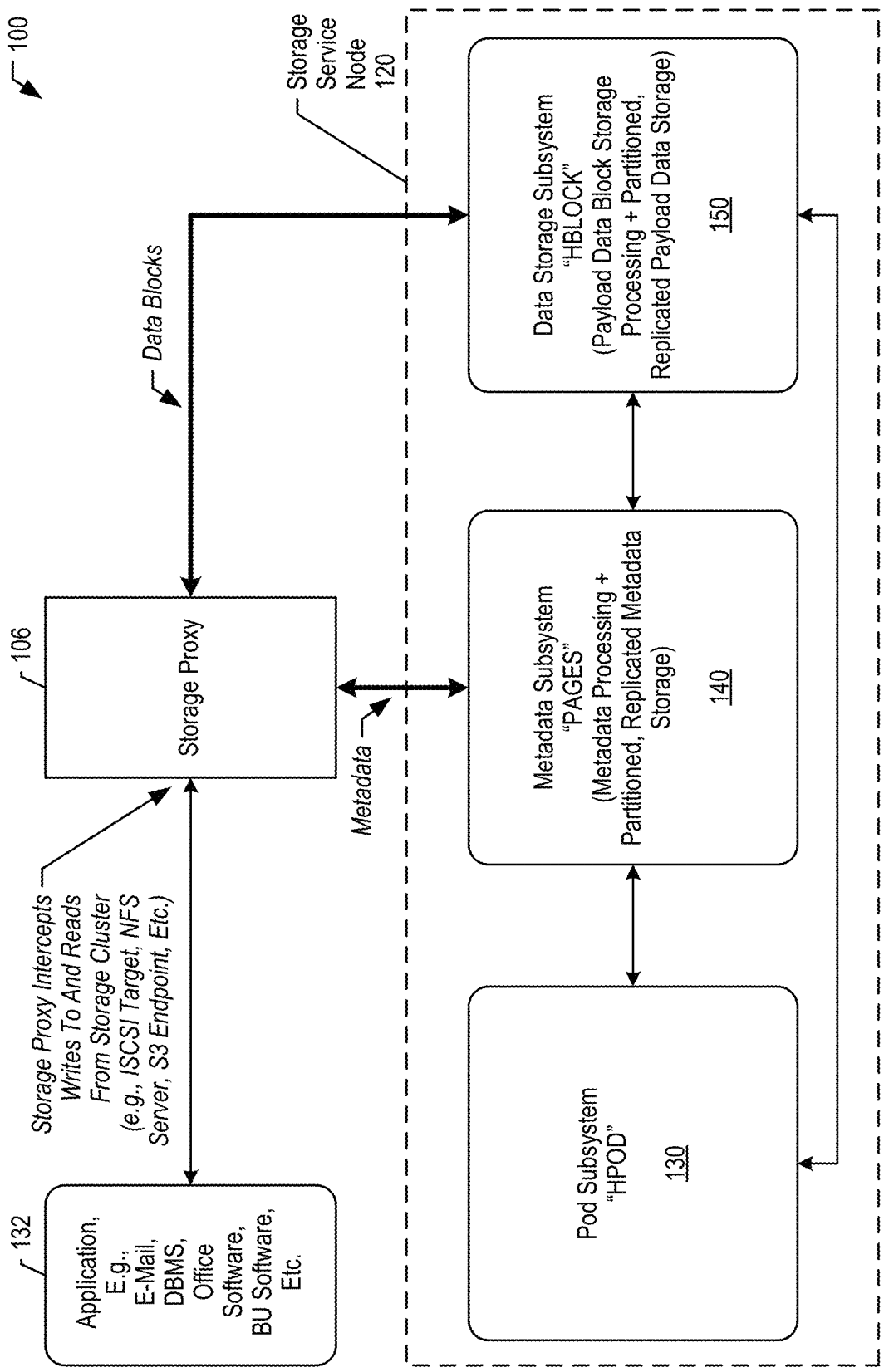
FIG. 1C Illustrative Storage Service Node Comprising Pod Synchronization Subsys., Metadata Subsys., And Data Storage Subsys.

| 350 | R directed to: | W directed to: | Node's Current State | Node(s) that handle R request: | Nodes(s) that handle W command: |
|---|---|---|---|---|---|
| 351 | - | - | JOINED | - | - |
| 352 | - | - | RUNNING | - | - |
| 353 | Old (current) | Old (current) | AUTHORIZED | Old (current) | Old (current) |
| 354 | Old (current) | Old (current) | AWARE | Old (current) | Old (current) |
| 355 | Old (current) | Old (current) | RESHUFFLED | Old (current) | Old & New |
| 356 | Old (current) | Old & New | TRANSFERRING | Old (current) | Old & New |
| 357 | Old (current) | Old & New | WAITING | Old (current) | Old & New |
| 358 | Old (current) | Old & New | SYNCHRONIZING | Old & New | Old & New |
| 359 | New (next) | Old & New | PRE-SWITCH | Old & New | Old & New |
| 360 | New (next) | Old & New | PRE-SWITCH+ (after callback received from barrier logic) | New (next) | Old & New |
| 362 | New (next) | New (next) | SWITCHING | New (next) | Old & New |
| 364 | New (next) | New (next) | SWITCHING+ (after callback received from barrier logic) | New (next) | New (next) |
| 365 | | | *"old view is now forgotten" and new (next) view becomes current (old) view* | | |
| 366 | Current (old) formerly New (next) | Current (old) formerly New (next) | GARBAGE COLLECTING | Current (old) formerly New (next) | Current (old) formerly New (next) |
| 367 | Current (old) formerly New (next) | Current (old) formerly New (next) | AUTHORIZED (barrier is reset) | Current (old) formerly New (next) | Current (old) formerly New (next) |
| 368 | - | - | DEAUTHORIZED | - | - |

FIG. 3B

COMMISSIONING AND DECOMMISSIONING METADATA NODES IN A RUNNING DISTRIBUTED DATA STORAGE SYSTEM

INCORPORATION BY REFERENCE TO ANY PRIORITY APPLICATIONS

This application is a Continuation of U.S. patent application Ser. No. 17/465,683 filed on Sep. 2, 2021, which claims the benefit of priority to the following U.S. Provisional applications: U.S. Provisional App. 63/081,503 filed on Sep. 22, 2020 with the title of "Anti-Entropy-Based Metadata Recovery In A Strongly Consistent Distributed Data Storage System"; and U.S. Provisional App. 63/082,624 filed on Sep. 24, 2020 with the title of "Commissioning And Decommissioning Metadata Nodes In A Running Distributed Data Storage System"; and U.S. Provisional App. 63/082,631 filed on Sep. 24, 2020 with the title of "Container Data Mover For Migrating Data Between Distinct Distributed Data Storage Systems Integrated With Application Orchestrators".

Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

SUMMARY

In a running distributed data storage system that actively processes reads and writes, metadata nodes are commissioned (added, bootstrapped, introduced) and/or decommissioned (removed, retired) without taking down or restarting the storage system, i.e., without causing interruptions to ongoing reads and writes from/to the storage system. Commissioning and decommissioning nodes within the running system enables failed nodes to be replaced and enables the system to adapt elastically to workload changes while still operating "live." Scaling up metadata capacity in the system without interrupting the underlying storage service is highly advantageous. An illustrative transition (or commissioning, decommissioning) process dynamically re-arranges the division of labor within the metadata subsystem to add and/or remove metadata nodes. A distributed barrier logic (a/k/a the "view change barrier" or "barrier") controls a complex multi-state transition process that interoperates with the affected metadata nodes and ensures their step-wise progression from state to state. The transition process gradually changes the division of labor for metadata handling and moves existing metadata until the transition is complete—while guaranteeing strong consistency of the system, including a guarantee that all metadata input/output (I/O) is handled error-free. The transition process allows for asynchronous progress among metadata nodes and for substantial latency in traversing the state machine. Thus, the illustrative commissioning and decommissioning process provides a technological improvement that enhances the resiliency, flexibility, and elasticity of the distributed data storage system.

For simplicity and to ease the reader's understanding of the present disclosure, most of the discussion herein will refer to commissioning of new metadata nodes. However, the process for decommissioning is similar to the commissioning process and therefore many aspects of commissioning also apply to decommissioning except where otherwise noted. Furthermore, the term "metadata" is distinguished herein from the term "data," even though both data and metadata comprise information stored on the illustrative distributed data storage system. Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "meta-metadata", such as fingerprint files. In the illustrative distributed data storage system, payload data and metadata are handled by distinct subsystems that operate according to distinct rules and organizational structures. The illustrative commissioning and decommissioning disclosed herein refers to the metadata subsystem that runs on metadata nodes.

A finite set of unique identifiers referred to as keys form a metadata "ring" that is used for consistent hashing in the distributed data storage system, which is designed for strong consistency. Each metadata node "owns" one or more regions of the metadata ring, i.e., owns one or more ranges of keys within the ring. For simplicity, the examples herein will use one range per node to ease the reader's understanding of the disclosure. The ring is subdivided among the metadata nodes so that any given key is associated with a defined metadata owner and its replica nodes, i.e., each key is associated with a defined set of metadata node replicas that store metadata associated with that key. The range of keys associated with each metadata node governs which metadata is stored, maintained, distributed, replicated, and managed by the owner metadata node. When a metadata node is added or removed from the distributed data storage system, this disrupts the ownership distribution of key ranges among the metadata nodes. The illustrative commissioning/decommissioning is a transition process that re-distributes key ranges among metadata nodes and methodically transfers the affected metadata from current metadata nodes to newly commissioned ones (or from decommissioned nodes to remaining ones). All the while, read and write operations in the distributed data storage system (metadata and payload data alike) continue without interruption.

Tokens delineate range boundaries. A token is a key in the metadata ring that acts as the end of a range. Thus a range begins where a preceding token leaves off and ends with the present token. In the present disclosure, the term "current" or "old" node refers to a metadata node that owns the token range in effect before the disruption caused by initiating a commissioning or decommissioning operation; and the term "new" or "next" node refers to a metadata node that owns the adjusted token range resulting from the commissioning/decommissioning. For example, an old node may own a range of 51-100; this range is disrupted by the addition of a new metadata node using token 75, resulting in new ranges of 76-100 and 51-75, for the old node and the new node respectively. In this example, the old node retains some of the range it held previously (e.g., 76-100), but the invention is not so limited. In some transitions, all the metadata nodes in the system may experience changes in their key ranges, but in other transitions, only some of the metadata nodes may be affected by range changes. Because the old and new designations relating to commissioning and decommissioning are based on ownership of token ranges, the terms "old owner" and "old range owner" are used interchangeably herein with the term "current node" and "old node." Correspondingly, the terms "new owner" and "new range owner" are used interchangeably herein with the term "new node" and "next node."

In the illustrative transition process for adding metadata nodes, first, metadata nodes are activated so that they participate in gossiping and initialize themselves, e.g., choosing their unique Storage ID (SID) and additionally choosing tokens, thus putting a claim on key ranges they want to own. Rack-awareness and data-center awareness may be applied here to ensure that range ownership is properly diversified, if need be. Once initialized, these new metadata nodes are part of the system, but are not yet requested to handle metadata reads and writes; for a while, such requests are handled by the old metadata nodes that were in the system before, which still own the ranges chosen by the new nodes. Next, new metadata writes are handled by both old and new nodes in parallel and atomically, i.e., old nodes handle writes as if they still owned the range being moved, storing new metadata in files that will not be copied to the new nodes, and new nodes store the metadata in files that complement those being copied from the old replicas; in case of failures in any of the writes, both replica sets fail the write to ensure consistency. Next, existing metadata (e.g., files comprising column families associated with the keys in the ranges) is copied from any old range replica node to any new range replica, and propagated to other replicas therefrom. Metadata read requests are initially handled only by old range owners, then by old and new owners, and eventually, after new range owners have copied all the metadata from the old owners and all the nodes are aware of this, read requests are handled only by the new owners. Finally, the old range ownership is forgotten (i.e., the old view of the metadata distribution) is forgotten and the new range ownership (i.e., the new view) becomes the current view (i.e., the "new normal") that governs how the system handles metadata I/O going forward.

To achieve the smooth and methodical transition of the commissioning and/or decommissioning process, the distributed data storage system implements the illustrative distributed barrier logic. The barrier is a state machine that executes in the pod subsystem. The pod subsystem is separate from the metadata subsystem. The barrier generates, maintains, and promulgates to the metadata nodes an "old view" of the old metadata range ownerships and also a "new view" reflecting where the new range ownership wants to land at the end of the transition. The old view and the new view are used by metadata nodes to distinguish the range ownership of themselves and of other metadata nodes at various states of the state machine. The barrier in the pod subsystem operates a series of gates that control metadata nodes' advances between states in the necessary progression, until the new view is fully operational and the old view has been forgotten. The barrier does not advance to the next gate until all affected metadata nodes have completed certain predicate steps.

Each state of a metadata node controls how the metadata node handles incoming input/output (I/O) requests and which metadata nodes it targets on outgoing I/Os. I/Os are targeted to metadata nodes based on key ownership. Thus, pre-defined rules determine where to send outgoing read requests and write commands (i.e., send to old node and/or to new node) and who should handle incoming read requests and write commands (i.e., whether the old node should serve the request and/or the new one should). These rules ensure that reads are served by metadata node(s) with current and accurate information and that writes are added to new nodes in order to advance the transition. Ultimately, after the states have advanced through the transition process, all reads and writes are addressed exclusively to and handled exclusively by the newly commissioned nodes (or remaining nodes in a decommission). In regard to a particular key range previously owned by old or decommissioned nodes, no more I/O requests are directed to those nodes. In this way, the distributed data storage system operates continuously, serving reads and writes, while metadata nodes are added, changed, and/or removed from the "live" system. Additionally, garbage collection processes running on the metadata nodes will discard metadata that no longer belongs to an old node after the commissioning and/or decommissioning is complete.

The individual state of each metadata node is reported to and persistently stored at the pod subsystem. Advantageously, this architectural aspect enables metadata nodes that fail during a commissioning/decommissioning process to resume operations from their last completed state, without having to replay the previously completed states or to start the commissioning or decommissioning from the beginning. Thus, the incremental step-wise (or gate-by-gate) progress made by each metadata node is retained in the pod subsystem persistently, which provides a major improvement in the fault tolerance of the distributed data storage system even in the face of in-transition failures.

The illustrative barrier is used for controlling and interoperating with metadata nodes, but is not needed for moving payload data among data nodes. Payload data movement within the distributed data storage system relies on the metadata subsystem, which tracks where payload data is stored and other information about the payload data. Thus, after the metadata subsystem has been re-arranged according to the illustrative commissioning and/or decommissioning, other processes may be applied to move payload data around the system, if necessary. However, commissioning and decommissioning of metadata nodes does not require corresponding payload data to be moved. An example of techniques for moving payload data may be found in U.S. patent application Ser. No. 17/179,160 filed on Feb. 18, 2021 with the title of "Container Data Mover For Migrating Data Between Distributed Data Storage Systems Integrated With Application Orchestrators."

The decommissioning procedure follows many of the steps of the commissioning procedure, except that metadata is not moved from nodes already in the system to new nodes being added, and instead moves from nodes being removed to nodes remaining in the system. The illustrative states that nodes go through are very similar for commissioning and decommissioning. At the end of decommissioning, nodes being removed go to a DEAUTHORIZED state. While in the DEAUTHORIZED state, decommissioned metadata nodes receive no requests to handle I/O. Unique system-wide identifiers for these decommissioned nodes (the Storage Identifiers or SIDs) are retired and are not re-used for other nodes. A node that is later re-commissioned will receive a new SID.

BRIEF DESCRIPTION OF THE DRAWINGS

FIG. 1C is a block diagram depicting certain subsystems of the storage service of distributed data storage system 100, according to an illustrative embodiment.

FIG. 3B depicts a table that describes read and write handling by metadata nodes involved in a commissioning or decommissioning operation.

DETAILED DESCRIPTION

Figure 1A:
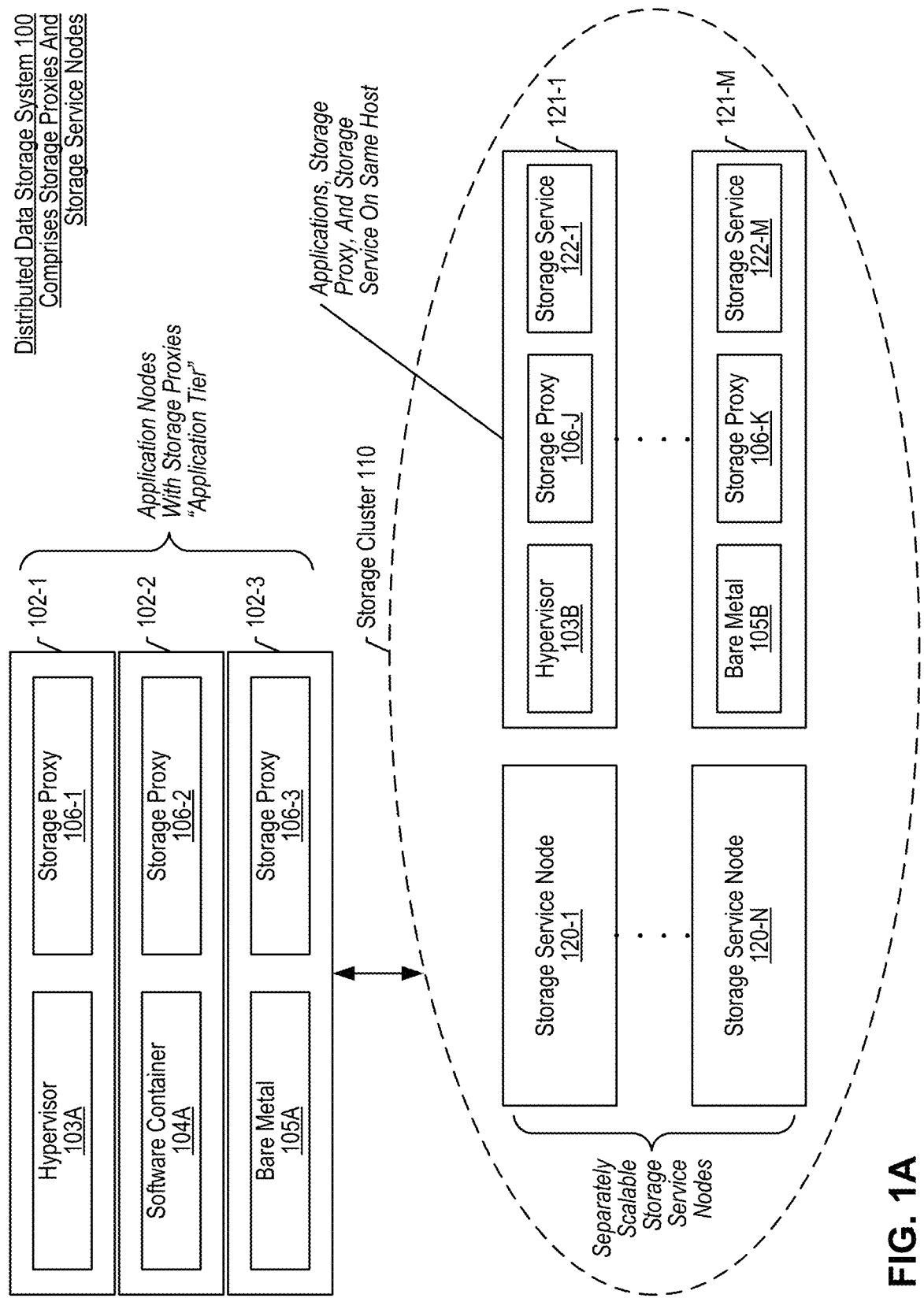
FIG. 1A is a block diagram depicting a distributed data storage system 100 according to an illustrative embodiment.

Detailed descriptions and examples of systems and methods according to one or more illustrative embodiments may be found herein and also in FIGS. 1A-5. Various embodiments described herein are intimately tied to, enabled by, and would not exist except for, computer technology. For example, storing and retrieving metadata to/from various storage nodes, and synchronizing and maintaining data structures for metadata described herein in reference to various embodiments cannot reasonably be performed by humans alone, without the computer technology upon which they are implemented.

Generally, the systems and associated components described herein may be compatible with and/or provide at least some of the functionality of the systems and corresponding components described in one or more of the following U.S. patents and patent applications assigned to Commvault Systems, Inc., each of which is hereby incorporated by reference in its entirety herein.

| Title | U.S. patent application Ser. No. | U.S. Pat. No. | Filing Date |
|---|---|---|---|
| Storage System For Provisioning And Storing Data To A Virtual Disk | 14/322,813 | 10,067,722 | Jul. 2, 2014 |
| Method For Writing Data To A Virtual Disk Using A Controller Virtual Machine And Different Storage And Communication Protocols | 14/322,832 | 9,875,063 | Jul. 2, 2014 |
| Disk Failure Recovery For Virtual Disk With Policies | 14/322,850 | 9,424,151 | Jul. 2, 2014 |
| Creating And Reverting To A Snapshot Of A Virtual Disk | 14/322,855 | 9,558,085 | Jul. 2, 2014 |
| Cloning A Virtual Disk In A Storage Platform | 14/322,867 | 9,798,489 | Jul. 2, 2014 |
| Writing To A Storage Platform Including A Plurality Of Storage Clusters | 14/322,868 | 9,483,205 | Jul. 2, 2014 |
| Time Stamp Generation For Virtual Disks | 14/322,871 | 9,411,534 | Jul. 2, 2014 |
| Method For Writing Data To Virtual Disk Using A Controller Virtual Machine And Different Storage And Communication Protocols On A Single Storage Platform | 14/684,086 | 9,864,530 | Apr. 10, 2015 |
| Dynamically Splitting A Range Of A Node In A Distributed Hash Table | 14/723,380 | Abandoned | May 27, 2015 |
| Storage System With Virtual Disks | PCT/US2015/38,687 | Expired | Jun. 30, 2015 |
| Global De-Duplication Of Virtual Disks In A Storage Platform | 15/155,838 | 10,846,024 | May 16, 2016 |
| De-Duplication Of Client-Side Data Cache For Virtual Disks | 15/156,015 | 10,795,577 | May 16, 2016 |
| Persistent Reservations For Virtual Disk Using Multiple Targets | 15/163,446 | 10,248,174 | May 24, 2016 |
| Synchronization Of Metadata In A Distributed Storage System | 15/834,921 | 10,740,300 | Dec. 7, 2017 |
| In-Flight Data Encryption/Decryption For A Distributed Storage Platform | 15/912,374 | 10,848,468 | Mar. 5, 2018 |
| Persistent Reservations For Virtual Disk Using Multiple Targets | 16/274,014 | 10,691,187 | Feb. 12, 2019 |

-continued

| Title | U.S. patent application Ser. No. | U.S. Pat. No. | Filing Date |
|---|---|---|---|
| Distributed Data Storage System Using Erasure Coding On Storage Nodes Fewer Than Data Plus Parity Fragments | 63/053,414 | NA | Jul. 17, 2020 |
| Distributed Data Storage System Using Erasure Coding On Storage Nodes Fewer Than Data Plus Parity Fragments | 63/065,722 | NA | Aug. 14, 2020 |
| Optimized Deduplication Based On Backup Frequency In A Distributed Data Storage System | 63/070,162 | NA | Aug. 25, 2020 |
| Anti-Entropy-Based Metadata Recovery In A Strongly Consistent Distributed Data Storage System | 63/081,503 | NA | Sep. 22, 2020 |
| Commissioning And Decommissioning Metadata Nodes In A Running Distributed Data Storage System | 63/082,624 | NA | Sep. 24, 2020 |
| Container Data Mover For Migrating Data Between Distinct Distributed Data Storage Systems Integrated With Application Orchestrators | 63/082,631 | NA | Sep. 24, 2020 |
| Optimized Deduplication Based On Backup Frequency In A Distributed Data Storage System | 17/153,667 | | Jan. 20, 2021 |
| Cloud-Based Distributed Data Storage System Using Block-Level Deduplication Based On Backup Frequencies Of Incoming Backup Copies | 17/153,674 | | Jan. 20, 2021 |
| Container Data Mover For Migrating Data Between Distributed Data Storage Systems Integrated With Application Orchestrators | 17/179,160 | | Feb. 18, 2021 |
| Decommissioning, Re-Commissioning, And Commissioning New Metadata Nodes In A Working Distributed Data Storage System | TBD | | TBD |
| Anti-Entropy-Based Metadata Recovery In A Strongly Consistent Distributed Data Storage System | TBD | | TBD |

Distributed Data Storage System

An example embodiment of the disclosed distributed data storage system is the Commvault Distributed Storage (f/k/a Hedvig Distributed Storage Platform) now available from Commvault Systems, Inc. of Tinton Falls, New Jersey, USA, and thus some of the terminology herein originated with the Hedvig product line. The illustrative distributed data storage system comprises a plurality of storage service nodes that form one or more storage clusters. Data reads and writes originating from an application on an application host computing device are intercepted by a storage proxy, which is co-resident with the originating application. The storage proxy performs some pre-processing and analysis functions before making communicative contact with the storage cluster. The system ensures strong consistency of data and metadata written to the storage service nodes.

Terminology for the Distributed Data Storage System

Data and Metadata. The term "metadata" is distinguished herein from the term "data." Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "meta-metadata."

Storage Service, e.g., Hedvig Storage Service. The storage service is a software component that installs on commodity x86 or ARM servers to transform existing server and storage assets into a fully-featured elastic storage cluster. The storage service may deploy to an on-premises infrastructure, to hosted clouds, and/or to public cloud computing environments, in any combination, to create a single system that is implicitly hybrid.

Storage Service Node (or storage node), e.g., Hedvig Storage Server (HSS), comprises both computing and storage resources that collectively provide storage service. The system's storage service nodes collectively form one or more storage clusters. Multiple groups of storage service nodes may be clustered in geographically and/or logically disparate groups, e.g., different cloud computing environments, different data centers, different usage or purpose of a storage cluster, etc., without limitation, and thus the present disclosure may refer to distinct storage clusters in that context. One or more of the following storage service subsystems of the storage service may be instantiated at and may operate on a storage service node: (i) distributed fault-tolerant metadata subsystem providing metadata service, e.g., "Hedvig Pages"; (ii) distributed fault-tolerant data subsystem (or data storage subsystem) providing payload data storage, e.g., "Hedvig HBlock"; and (iii) distributed fault-tolerant pod subsystem for generating and maintaining certain system-level information, e.g., "Hedvig HPod." The system stores payload data on certain dedicated storage resources managed by the data storage subsystem, and stores metadata on other dedicated storage resources managed by the metadata subsystem. Thus, another way to distinguish payload data from metadata in the illustrative system is that payload data is stored in and maintained by the data storage subsystem and metadata is stored in and maintained by the metadata subsystem. The pod subsystem, the metadata subsystem, and the data storage subsystem are all partitioned and replicated across various storage service nodes. These subsystems operate as independent services, they need not be co-located on the same storage service node, and they may communicate with a subsystem on another storage service node as needed.

Replica. The distributed data storage system replicates data and metadata across multiple storage service nodes. A "replica" or "replica node" is a storage service node that hosts a replicated copy of data and/or metadata that is also stored on other replica nodes. Illustratively, metadata uses a replication factor of 3 ("RF3"), though the invention is not so limited. Thus, with a replication factor of 3, each portion of metadata is replicated on three distinct metadata nodes across the storage cluster. Data replicas and metadata replicas need not be the same nodes and can reside on distinct storage service nodes that do not overlap.

Virtual Disk ("vdisk") and Storage Containers. The virtual disk is the unit of storage made visible by system 100 to applications and/or application nodes. Every virtual disk provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, virtual disks are distributed and fault-tolerant.

Storage Pools. Storage pools are logical groupings of physical disks/drives in a storage service node and are configured as the protection unit for disk/drive failures and rebuilds. Within a replica, one or more storage containers are assigned to a storage pool. A typical storage service node will host two to four storage pools.

Metadata Node. An instance of the metadata subsystem executing on a storage service node is referred to as a metadata node that provides "metadata service." The metadata subsystem executing on a storage service node stores metadata at the storage service node. The metadata node communicates with other metadata nodes to provide a system-wide metadata service. The metadata subsystem also communicates with pod and/or data storage subsystems at the same or other storage service nodes. A finite set of unique identifiers referred to as keys form a metadata "ring" that is the basis for consistent hashing in the distributed data storage system, which is designed for strong consistency. Each metadata node "owns" one or more regions of the metadata ring, i.e., owns one or more ranges of keys within the ring. The ring is subdivided among the metadata nodes so that any given key is associated with a defined metadata owner and its replica nodes, i.e., each key is associated with a defined set of metadata node replicas. The range(s) of keys associated with each metadata node governs which metadata is stored, maintained, distributed, replicated, and managed by the owner metadata node. Tokens delineate range boundaries. Each token is a key in the metadata ring that acts as the end of a range. Thus a range begins where a preceding token leaves off and ends with the present token. Some metadata nodes are designated owners of certain virtual disks whereas others are replicas but not owners. Owner nodes are invested with certain functionality for managing the owned virtual disk.

Data Node. An instance of the data storage service executing on a storage service node is referred to as a Data Node that provides payload data storage, i.e., comprises payload data associated with and tracked by metadata.

Metadata Node Identifier or Storage Identifier (SID) is a unique identifier of the metadata service instance on a storage service node, i.e., the unique system-wide identifier of a metadata node. A similar term identifies the tokens that a metadata node is responsible for, but if the node SID has form X, the token SID has form X$i, where i is a number, the index number of the token among the metadata node's keys within the range.

Storage Proxy. Each storage proxy is a lightweight software component that deploys at the application tier, i.e., on application servers or hosts. A storage proxy may be implemented as a virtual machine (VM) or as a software container (e.g., Docker), or may run on bare metal to provide storage access to any physical host or VM in the application tier. As noted, the storage proxy intercepts reads and writes issued by applications and directs input/output (I/O) requests to the relevant storage service nodes.

Erasure Coding (EC). In some embodiments, the illustrative distributed data storage system employs erasure coding rather than or in addition to replication. EC is one of the administrable attributes for a virtual disk. The default EC policy is (4,2), but (8,2) and (8,4) are also supported if a sufficient number of storage service nodes are available. The invention is not limited to a particular EC policy unless otherwise noted herein.

FIG. 1A is a block diagram depicting a distributed data storage system 100 according to an illustrative embodiment. The figure depicts: a plurality of application nodes 102 that form an "application tier," each application node comprising a storage proxy 106 and one of components 103A, 104A, and 105A; and a storage cluster 110 comprising a plurality of separately scalable storage service nodes 120 and a plurality of specially-equipped compute hosts 121. Distributed data storage system 100 (or system 100) comprises storage proxies 106 and storage cluster 110. System 100 flexibly leverages both hyperscale and hyperconverged deployment options, sometimes implemented in the same storage cluster 110 as depicted here. Hyperscale deployments scale storage resources independently from the application tier, as shown by storage service nodes 120 (e.g., 120-1 . . . 120-N). In such hyperscale deployments, storage capacity and performance scale out horizontally by adding commodity servers running the illustrative storage service; application nodes (or hosts) 102 scale separately along with storage proxy 106. On the other hand, hyperconverged deployments scale compute and storage in lockstep, with workloads and applications residing on the same physical nodes as payload data, as shown by compute hosts 121. In such hyperconverged deployments, storage proxy 106 and storage service software 122 are packaged and deployed as VMs on a compute host 121 with a hypervisor 103 installed. In some embodiments, system 100 provides plug-ins for hypervisor and virtualization tools, such as VMware vCenter, to provide a single management interface for a hyperconverged solution.

System 100 provides enterprise-grade storage services, including deduplication, compression, snapshots, clones, replication, auto-tiering, multitenancy, and self-healing of both silent corruption and/or disk/node failures to support production storage operations, enterprise service level agreements (SLAs), and/or robust storage for backed up data (secondary copies). Thus, system 100 eliminates the need for enterprises to deploy bolted-on or disparate solutions to deliver a complete set of data services. This simplifies infrastructure and further reduces overall Information Technology (IT) capital expenditures and operating expenses. Enterprise storage capabilities can be configured at the granularity of a virtual disk, providing each data originator, e.g., application, VM, and/or software container, with its own unique storage policy. Every storage feature can be switched on or off to fit the specific needs of any given workload. Thus, the granular provisioning of features empowers administrators to avoid the challenges and compromises of "one size fits all" storage and helps effectively support business SLAs, while decreasing operational costs.

System 100 inherently supports multi-site availability, which removes the need for additional costly disaster recovery solutions. The system provides native high availability storage for applications across geographically dispersed data centers by setting a unique replication policy and replication factor at the virtual disk level. System 100 comprises a "shared-nothing" distributed computing architecture in which each storage service node is independent and self-sufficient. Thus, system 100 eliminates any single point of failure, allows for self-healing, provides non-disruptive upgrades, and scales indefinitely by adding more storage service nodes. Each storage service node stores and processes metadata and/or payload data, then communicates with other storage service nodes for data/metadata distribution according to the replication factor.

Storage efficiency in the storage cluster is characterized by a number of features, including: thin provisioning, deduplication, compression, compaction, and auto-tiering. Each virtual disk is thinly provisioned by default and does not consume capacity until data is written therein. This space-efficient dynamic storage allocation capability is especially useful in DevOps environments that use Docker, OpenStack, and other cloud platforms where volumes do not support thin provisioning inherently, but can support it using the virtual disks of system 100. System 100 provides inline global deduplication that delivers space savings across the entire storage cluster. Deduplication is administrable at the virtual disk level to optimize I/O and lower the cost of storing data. As writes occur, the system 100 calculates the unique fingerprint of data blocks and replaces redundant data with a small pointer. The deduplication process can be configured to begin at storage proxy 106, improving write performance and eliminating redundant data transfers over the network. System 100 provides inline compression administrable at the virtual disk level to optimize capacity usage. The system stores only compressed data on the storage service nodes. Illustratively, the Snappy compression library is used, but the invention is not limited to this implementation. To improve read performance and optimize storage space, the illustrative system periodically performs garbage collection to compact redundant blocks and generate large sequential chunks of data. The illustrative system balances performance and cost by supporting tiering of data among high-speed SSDs and lower-tier persistent storage technologies.

Application node (or host) 102 (e.g., 102-1, 102-2, 102-3) is any computing device, comprising one or more hardware processors and computer memory for executing computer programs, that generates and/or accesses data stored in storage cluster 110. Application(s) (not shown here but see, e.g., applications 132 in FIG. 1B) executing on an application node 102 use storage cluster 110 as a data storage resource. Application node 102 can take the form of: a bare metal host 105A for applications with storage proxy 106-3; a virtual machine server with hypervisor 103A and storage proxy 106-1; a container host hosting software container 104A and storage proxy 106-2; and/or another computing device configuration equipped with a storage proxy 106.

Hypervisor 103 (e.g., 103A, 103B) is any hypervisor, virtual machine monitor, or virtualizer that creates and runs virtual machines on a virtual machine server or host. Software container 104A is any operating system virtualization software that shares the kernel of the host computing device (e.g., 102, 121) that it runs on and allows multiple isolated user space instances to co-exist. Docker is an example of software container 104A. Bare metal 105A refers to application node 102-3 running as a traditional computing device without virtualization features. Components 103, 104A, and 105A/B are well known in the art.

Storage proxy 106 (e.g., 106-1, 106-2, 106-3, 106-J . . . 106-K) is a lightweight software component that deploys at the application tier, i.e., on application nodes 102 and/or compute hosts 121. A storage proxy may be implemented as a virtual machine 106-1, as a software container (e.g., Docker) 106-2, and/or running on bare metal (e.g., 106-3) to provide storage access to any physical host or VM in the application tier. The storage proxy acts as a gatekeeper for all I/O requests to virtual disks configured at storage cluster 110. It acts as a storage protocol converter, load balances I/O requests to storage service nodes, caches data fingerprints, and performs certain deduplication functions. Storage protocols supported by storage proxy 106 include Internet Small Computer Systems Interface (iSCSI), Network File System (NFS), Server Message Block (SMB2) or Common Internet File System (CIFS), Amazon Simple Storage Service (S3), OpenStack Object Store (Swift), without limitation. The storage proxy runs in user space and can be managed by any virtualization management or orchestration tool. With storage proxies 106 that run in user space, the disclosed solution is compatible with any hypervisor, software container, operating system, or bare metal computing environment at the application node. In some virtualized embodiments where storage proxy 106 is deployed on a virtual machine, the storage proxy may be referred to as a "controller virtual machine" (CVM) in contrast to application-hosting virtual machines that generate data for and access data at the storage cluster.

Storage cluster 110 comprises the actual storage resources of system 100, such as storage service nodes 120 and storage services 122 running on compute hosts 121. In some embodiments, storage cluster 110 is said to comprise compute hosts 121 and/or storage service nodes 120. Storage service node 120 (e.g., 120-1 . . . 120-N) is any commodity server configured with one or more x86 or ARM hardware processors and with computer memory for executing the illustrative storage service, which is described in more detail in FIG. 1C. Storage service node 120 also comprises storage resources as described in more detail in FIG. 1D. By running the storage service, the commodity server is transformed into a full-featured component of storage cluster 110. System 100 may comprise any number of storage service nodes 120. Compute host 121 (e.g., 121-1 . . . 121-M) is any computing device, comprising one or more hardware processors and computer memory for executing computer programs, that comprises the functional components of an application node 102 and of a storage service node 120 in a "hyperconverged" configuration. In some embodiments, compute hosts 121 are configured, sometimes in a group, within an appliance such as the Commvault Hyperscale™ X backup appliance from Commvault Systems Inc., of Tinton Falls, New Jersey, USA.

Figure 1B:
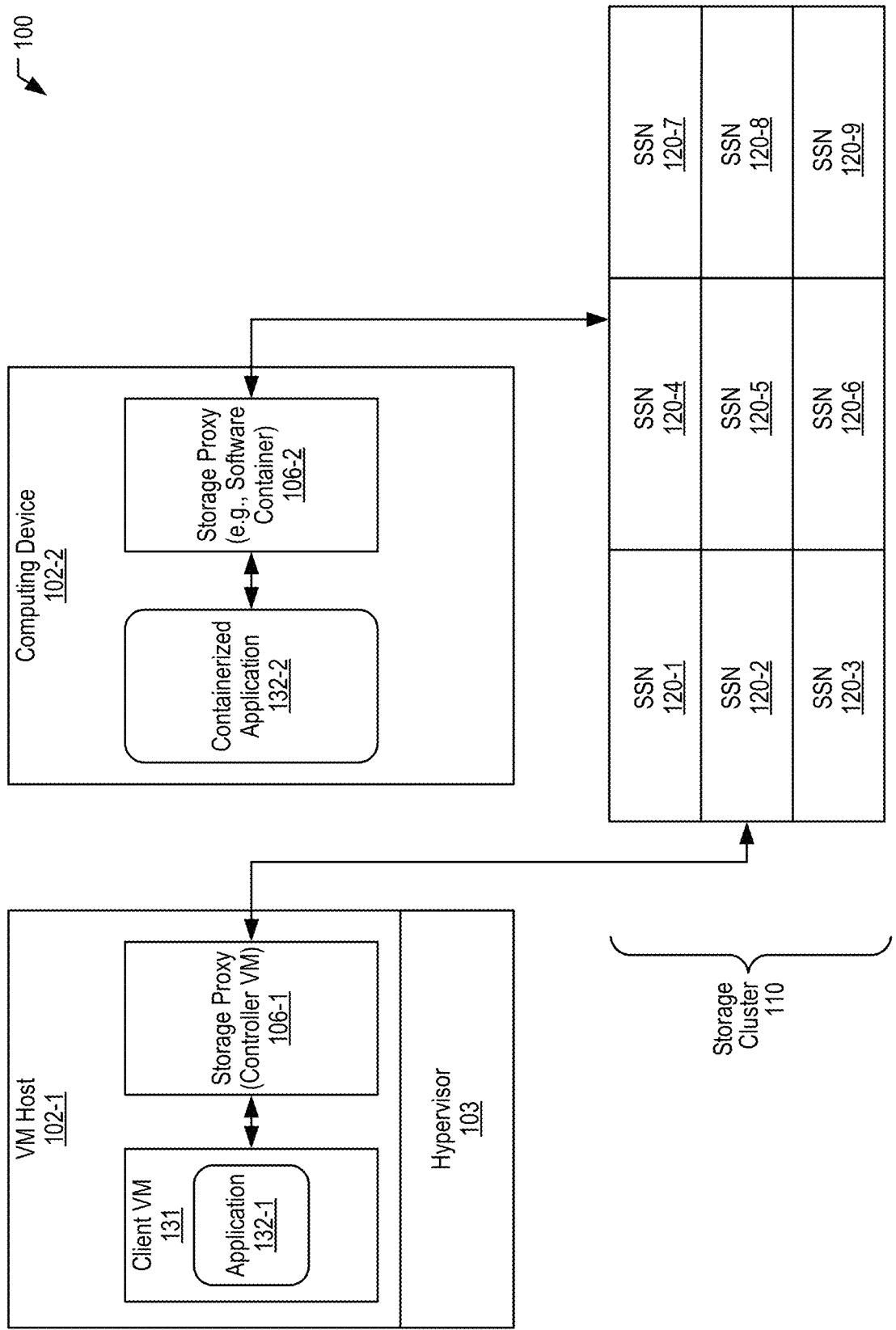
FIG. 1B is a block diagram illustrating some details of the distributed data storage system 100 comprising separately scalable storage service nodes according to an illustrative embodiment.

FIG. 1B is a block diagram illustrating some details of the distributed data storage system 100 comprising separately scalable storage service nodes 120 according to an illustrative embodiment. The figure depicts: application node 102-1 embodied as a VM host and hosting hypervisor 103, storage proxy 106-1 embodied as a controller virtual machine, and client VM 131 hosting application 132-1; application node 102-2 hosting containerized storage proxy 106-2 and containerized application 132-2; and storage cluster 110 comprising nine (9) distinct physical storage service nodes 120 (e.g., 120-1 . . . 120-9). Virtual machine hosts, virtual machines, and hypervisors are well known in the art. Although not expressly depicted in the present figure, in some embodiments, an application orchestrator node (e.g., Kubernetes node and/or Kubernetes kubelet and/or another Kubernetes-based technology, etc.) may be implemented as an application node 102 instead of, or in addition to, components 102-1, 102-2, and 102-3. In such a configuration, the application orchestrator node comprises or hosts one or more containerized applications (e.g., 132-2) and a containerized storage proxy 106 (e.g., 106-2), as well as a container storage interface (CSI) driver that is preferably implemented as an enhanced and proprietary CSI driver, such the one disclosed in one or more patent applications deriving priority from U.S. Provisional Patent Application 63/082,631 filed on Sep. 24, 2020.

Application 132 (e.g., 132-1, 132-2) is any software that executes on its underlying host (e.g., 102-1, 102-2) and performs a function as a result. The application 132 may generate data and/or need to access data which is stored in system 100. Examples of application 132 include email applications, database management applications, office productivity software, backup software, etc., without limitation.

The bi-directional arrows between each storage proxy 106 and a storage service node 120 depict the fact that communications between applications 132 and storage cluster 110 pass through storage proxies 106, each of which identifies a proper storage service node 120 to communicate with for the present transaction, e.g., storage service node 120-2 for storage proxy 106-1, storage service node 120-4 for storage proxy 106-2, without limitation.

FIG. 1C is a block diagram depicting certain subsystems of the storage service of distributed data storage system 100, according to an illustrative embodiment. Depicted here are: storage proxy 106; application 132; and a storage service node 120 comprising a pod subsystem 130 (e.g., Hedvig "HPOD"), a metadata subsystem 140 (e.g., Hedvig "PAGES"), and a data storage subsystem 150 (e.g., Hedvig "HBLOCK"). Although storage service node 120 as depicted here comprises an instance of all three storage service subsystems, any given storage service node 120 need not comprise all three subsystems. Thus, a subsystem running on a given storage service node may communicate with one or more subsystems on another storage service node as needed to complete a task or workload.

Storage proxy 106 intercepts reads and writes issued by applications 132 that are targeted to particular virtual disks configured in storage cluster 110. Storage proxy 106 provides native block, file, and object storage protocol support, as follows:

Block storage—system 100 presents a block-based virtual disk through a storage proxy 106 as a logical unit number (LUN). Access to the LUN, with the properties applied during virtual disk provisioning, such as compression, deduplication and replication, is given to a host as an iSCSI target. After the virtual disk is in use, the storage proxy translates and relays all LUN operations to the underlying storage cluster.

File storage—system 100 presents a file-based virtual disk to one or more storage proxies 106 as an NFS export, which is then consumed by the hypervisor as an NFS datastore. Administrators can then provision VMs on that NFS datastore. The storage proxy acts as an NFS server that traps NFS requests and translates them into the appropriate remote procedure call (RPC) calls to the backend storage service node.

Object storage—buckets created via the Amazon S3 API, or storage containers created via the OpenStack Swift API, are translated via the storage proxies 106 and internally mapped to virtual disks 170. The storage cluster 110 acts as the object (S3/Swift) target, which client applications 132 can utilize to store and access objects.

Storage Proxy 106 comprises one or more caches that enable distributed operations and the performing of storage system operations locally at the application node 102 to accelerate read/write performance and efficiency. An illustrative metacache stores metadata locally at the storage proxy, preferably on SSDs. This cache eliminates the need to traverse the network for metadata lookups, leading to substantial read acceleration. For virtual disks provisioned with client-side caching, an illustrative block cache stores data blocks to local SSD drives to accelerate reads. By returning blocks directly from the storage proxy, read operations avoid network hops when accessing recently used data. For virtual disks provisioned with deduplication, an illustrative dedupe cache resides on local SSD media and stores fingerprint information of certain data blocks written to storage cluster 110. Based on this cache, the storage proxy determines whether data blocks have been previously written and if so, avoids re-writing these data blocks again. Storage proxy 106 first queries the dedupe cache and if the data block is a duplicate, storage proxy 106 updates the metadata subsystem 140 to map the new data block(s) and acknowledges the write to originating application 132. Otherwise, storage proxy 106 queries the metadata subsystem 140 and if the data block was previously written to storage cluster 110, the dedupe cache and the metadata subsystem 140 are updated accordingly, with an acknowledgement to originating application 132. Unique new data blocks are written to the storage cluster as new payload data. More details on reads and writes are given in FIGS. 1E and 1F.

A simplified use case workflow comprises: 1. A virtual disk 170 is administered with storage policies via a web-based user interface, a command line interface, and/or a RESTful API (representational state transfer application programming interface). 2. Block and file virtual disks are attached to a storage proxy 106, which presents the storage resource to application hosts, e.g., 102. For object storage, applications 132 directly interact with the virtual disk via Amazon S3 or OpenStack Swift protocols. 3. Storage proxy 106 intercepts application 132 I/O through the native storage protocol and communicates it to the underlying storage cluster 110 via remote procedure calls (RPCs). 4. The storage service distributes and replicates data throughout the storage cluster based on virtual disk policies. 5. The storage service conducts background processes to auto-tier and balance across racks, data centers, and/or public clouds based on virtual disk policies.

Pod subsystem 130 maintains certain system-wide information for synchronization purposes and comprises processing and tracking resources and locally stored information. A network of pods 130 throughout storage cluster 110, where each pod comprises three nodes, is used for managing transactions for metadata updates, distributed-atomic-counters as a service, tracking system-wide timeframes such as generations and epochs, etc. More details on the pod subsystem may be found in U.S. Pat. No. 9,483,205 B2, which is incorporated by reference in its entirety herein.

Metadata subsystem 140 comprises metadata processing resources and partitioned replicated metadata stored locally at the storage service node. Metadata subsystem 140 receives, processes, and generates metadata. Metadata in system 100 is partitioned and replicated across a plurality of metadata nodes. Typically, metadata subsystem 140 is configured with a replication factor of 3 (RF3), and therefore many of the examples herein will include 3-way replication scenarios, but the invention is not so limited. Each metadata subsystem 140 tracks the state of data storage subsystems 150 and of other metadata subsystems 140 in storage cluster 110 to form a global view of the cluster. Metadata subsystem 140 is responsible for optimal replica assignment and tracks writes in storage cluster 110.

Data storage subsystem 150 receives, processes, and stores payload data written to storage cluster 110. Thus, data storage subsystem 150 is responsible for replicating data to other data storage subsystems 150 on other storage service nodes and striping data within and across storage pools. Data storage subsystem 150 comprises storage processing for payload data blocks (e.g., I/O, compaction, garbage collection, etc.) and stores partitioned replicated payload data at the storage service node.

The bold bi-directional arrows in the present figure show that metadata is communicated between storage proxy 106 and metadata subsystem 140, whereas data blocks are transmitted to/from data storage subsystem 150. Depending on the configuration, metadata subsystem 140 may operate on a first storage service node 120 or storage service 122 and data storage subsystem 150 may operate on another distinct storage service node 120 or storage service 122. See also FIGS. 1E and 1F.

Figure 1D:
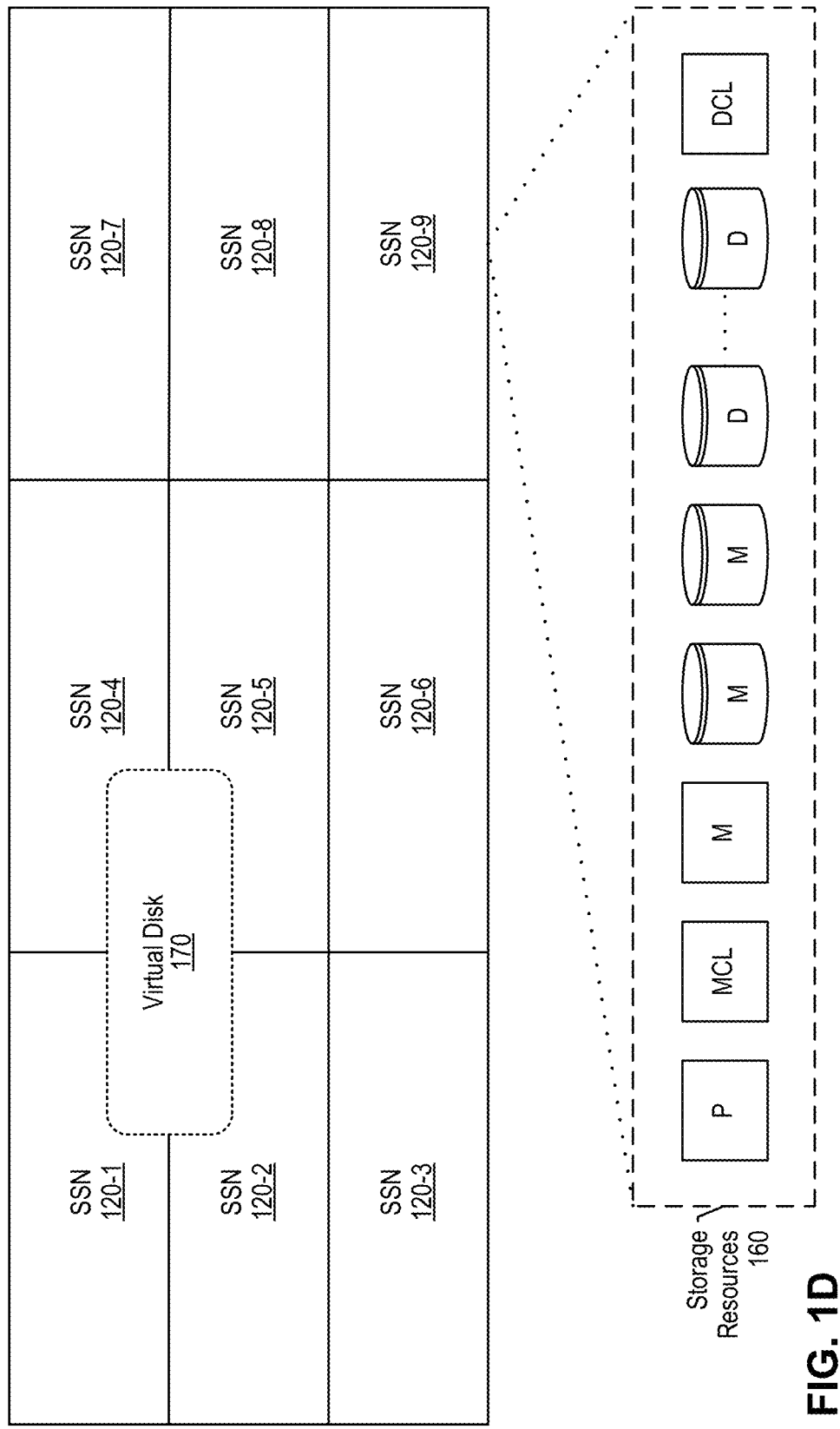
FIG. 1D is a block diagram depicting a virtual disk distributed across a plurality of storage service nodes and also depicting a plurality of storage resources available at each storage service node according to an illustrative embodiment.

FIG. 1D is a block diagram depicting a virtual disk distributed across a plurality of storage service nodes and also depicting a plurality of storage resources available at each storage service node according to an illustrative embodiment. The present figure depicts: nine storage service nodes 120 (120-1 . . . 120-09); a virtual disk 170 that comprises data distributed over four of the storage service nodes —120-1, 120-2, 120-4, and 120-5; and storage resources 160 configured within storage service node 120-9.

Each storage service node 120 (or compute host 121) is typically configured with computing resources (e.g., hardware processors and computer memory) for providing storage services and with a number of storage resources 160, e.g., hard disk drives (HDD) shown here as storage disk shapes, solid state storage drives (SSD) (e.g., flash memory technology) shown here as square shapes, etc. The illustrative system uses commit logs, which are preferably stored on SSD before they are flushed to another disk/drive for persistent storage. Metadata commit logs are stored on dedicated metadata-commit-log drives "MCL", whereas payload-data commit logs are stored on distinct dedicated data-commit-log drives "DCL." As an example depicted in the present figure, pod system information is stored in storage resource "P" which is preferably SSD technology for faster read/write performance; the metadata commit log is stored in storage resource "MCL" which is preferably SSD technology; metadata is then flushed from the commit log to persistent storage "M" (SSD and/or HDD); the data commit log is stored in storage resource "DCL" which is preferably SSD technology; payload data is then flushed from the data commit log to persistent storage "D" (typically HDD). The storage resources 160 depicted in the present figures are shown here as non-limiting examples to ease the reader's understanding; the numbers and types of storage technologies among storage resources 160 will vary according to different implementations.

To accelerate read operations, client-side caching of data is used on SSDs accessible by the storage proxy 106. Data is also cached on SSDs at storage service nodes. For caching, the system supports the use of Peripheral Component Interconnect Express (PCIe) and Non-Volatile Memory Express (NVMe) SSDs. All writes are executed in memory and flash (SSD/NVMe) and flushed sequentially to persistent storage. Persistent storage uses flash technology (e.g., multi-level cell (MLC) and/or 3D NAND SSD) and/or spinning disk technology (e.g., HDD)). Options are administrable at the virtual disk level.

Virtual disk ("vdisk") 170 is the data storage representation of system 100 that is visible to and accessible by applications 132 as data storage resources. In other words, each application 132 will use one or more virtual disks 170 for data storage without having knowledge of how system 100 as a whole is organized and configured. Every virtual disk 170 provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, the virtual disks are distributed and fault-tolerant. Notably, the replication factor alone (e.g., RF3) does not limit how many storage service nodes 120 may comprise payload data of a given virtual disk 170. Thus, different containers of the virtual disk may be stored and replicated on different storage service nodes, adding up to more total storage service nodes associated with the virtual disk than the replication factor of the virtual disk.

Any number of virtual disks 170 may be spun up, each one thinly provisioned and instantly available. Illustrative user-configurable attributes for virtual disk 170 include without limitation: Name—a unique name to identify the virtual disk. Size—to set the desired virtual disk size. System 100 supports single block and NFS virtual disks of unlimited size. Disk Type—to specify the type of storage protocol to use for the virtual disk: block or file (NFS). Object containers/buckets are provisioned directly from OpenStack via Swift, via the Amazon S3 API, etc. Workload Type—for NFS disk type, options include default, proprietary, or object storage target (OST) workload types. For proprietary and OST, if Enable Deduplication is selected, a Retention Policy can be added as well. For block disk type, the only option is default. Retention Policy—specifies a duration for proprietary and OST workloads, e.g., two weeks, one month, etc. Encryption—to encrypt both data at rest and data in flight for the virtual disk. Enable Deduplication—to enable inline global deduplication. Clustered File System—to indicate that the virtual disk will be used with a clustered file system. When selected, system 100 enables concurrent read/write operations from multiple VMs or hosts. Description—to provide an optional brief description of the virtual disk. Compressed—to enable virtual disk compression to reduce data size. Client-Side Caching—to cache data to local SSD or PCIe devices at the application tier to accelerate read performance. CSV—to enable Cluster Shared Volumes for failover (or high availability) clustering.

A CSV is a shared disk containing a Windows NT File System (NTFS) or Resilient File System (ReFS) volume that is made accessible for read and write operations by all nodes within a Windows Server failover cluster. Replication Policy—to set the policy for how data will replicate across the cluster: Agnostic, Rack Aware, or Data Center Aware. Replication Factor (RF)—to designate the number of replicas for each virtual disk. Replication factor is tunable, typically ranging from one to six, without limitation. Block Size—to set a block virtual disk size to 512 bytes, 4k or 64k. File (NFS)-based virtual disks have a standard 512 size, and object-based virtual disks have a standard 64K size. Residence—to select the type of media on which the data is to reside: HDD, SSD. The present figure depicts only one virtual disk 170 for illustrative purposes, but system 100 has no limits on how many virtual disks it may support.

Figure 1E:
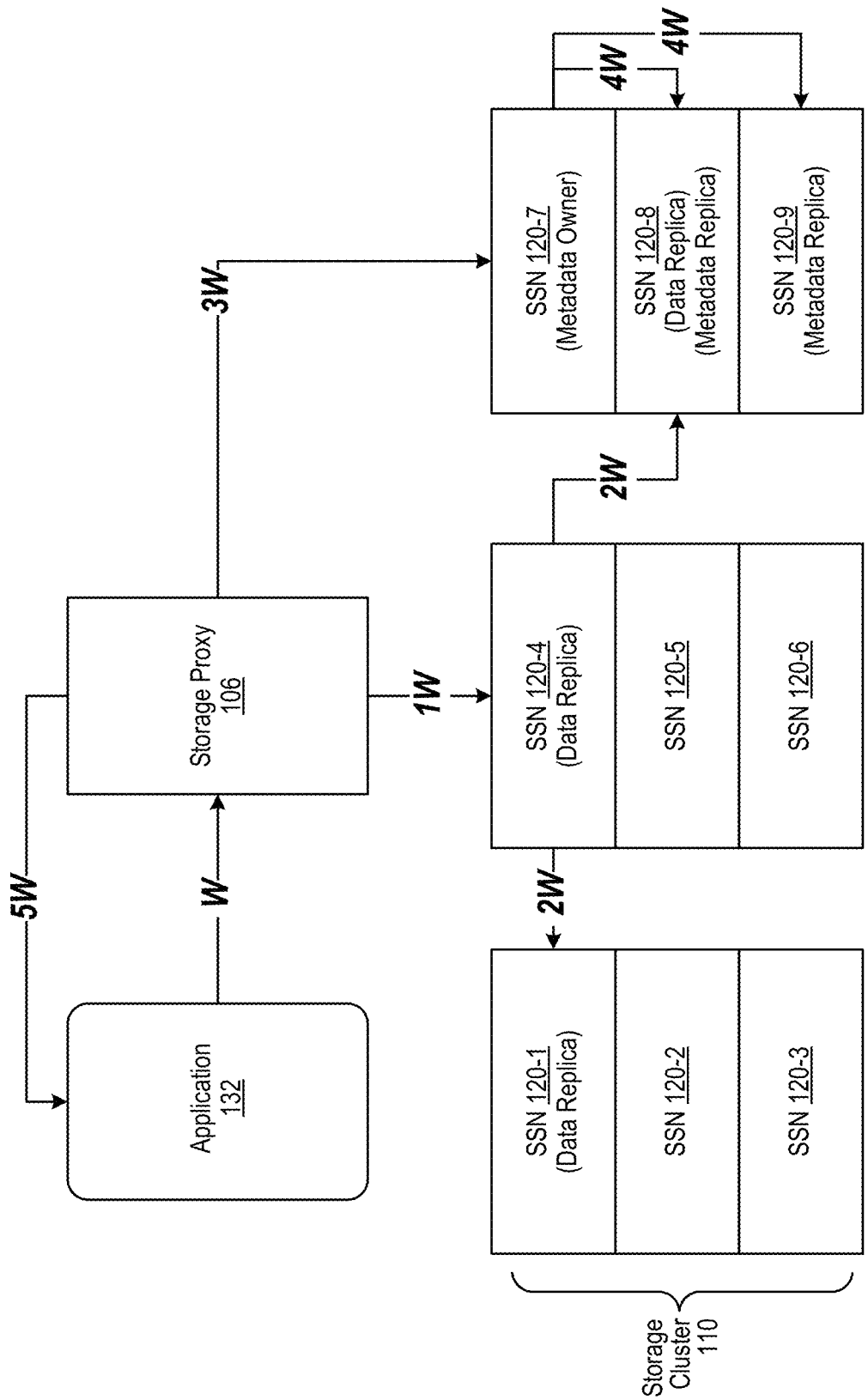
FIG. 1E is a block diagram depicting a typical I/O workflow for write operations originating with an application.

FIG. 1E is a block diagram depicting a typical I/O workflow for write operations originating with an application. This figure depicts an application 132 writing to storage cluster 110, illustratively writing to a virtual disk 170 configured with Replication Factor=3 (RF3).

At step W, storage proxy 106 intercepts a write command issued by application 132, comprising one or more payload data blocks to be written to a virtual disk 170 in storage cluster 110. The write command typically identifies the targeted virtual disk 170 and also identifies a targeted inode (data file identifier) that is to receive the payload data. At step 1W, storage proxy 106 determines replica nodes 120 for the data blocks to be written to and transmits the data blocks to one such replica node, e.g., 120-4. If the virtual disk is enabled for deduplication, the storage proxy 106 calculates a data block fingerprint, queries the dedupe cache and, if necessary, further queries metadata subsystem 140 (at the virtual disk's metadata owner node, e.g., 120-7), and either makes a metadata update or proceeds with a new payload write. At step 2W, the data storage subsystem 150 on replica node 120-4 receives and writes the data blocks locally and additionally distributes them to other designated replica nodes, e.g., 120-1 and 120-8. For RF3, two acknowledged successful writes are needed from the three (RF3) replicas to satisfy the quorum (RF/2+1=3/2+1=2). Two of the three replicas are written synchronously, and one may be written asynchronously. For EC, a different quorum value applies, but the same principle is used: the data block write is deemed successful after the quorum is met and acknowledged back to the node that distributed the data fragments. At step 3W, storage proxy 106 causes an atomic write to be made into metadata subsystem 140 at metadata owner node 120-7, which tracks the successful write of the payload data into the data storage subsystem 150. At step 4W, metadata subsystem 140 replicates the metadata from node 120-7 to designated metadata replica nodes, e.g., 120-8 and 120-9. At step 5W, storage proxy 106 sends a write acknowledgment back to the originating application 132 after the payload data and the metadata have been successfully written to the appropriate storage service nodes.

Figure 1F:
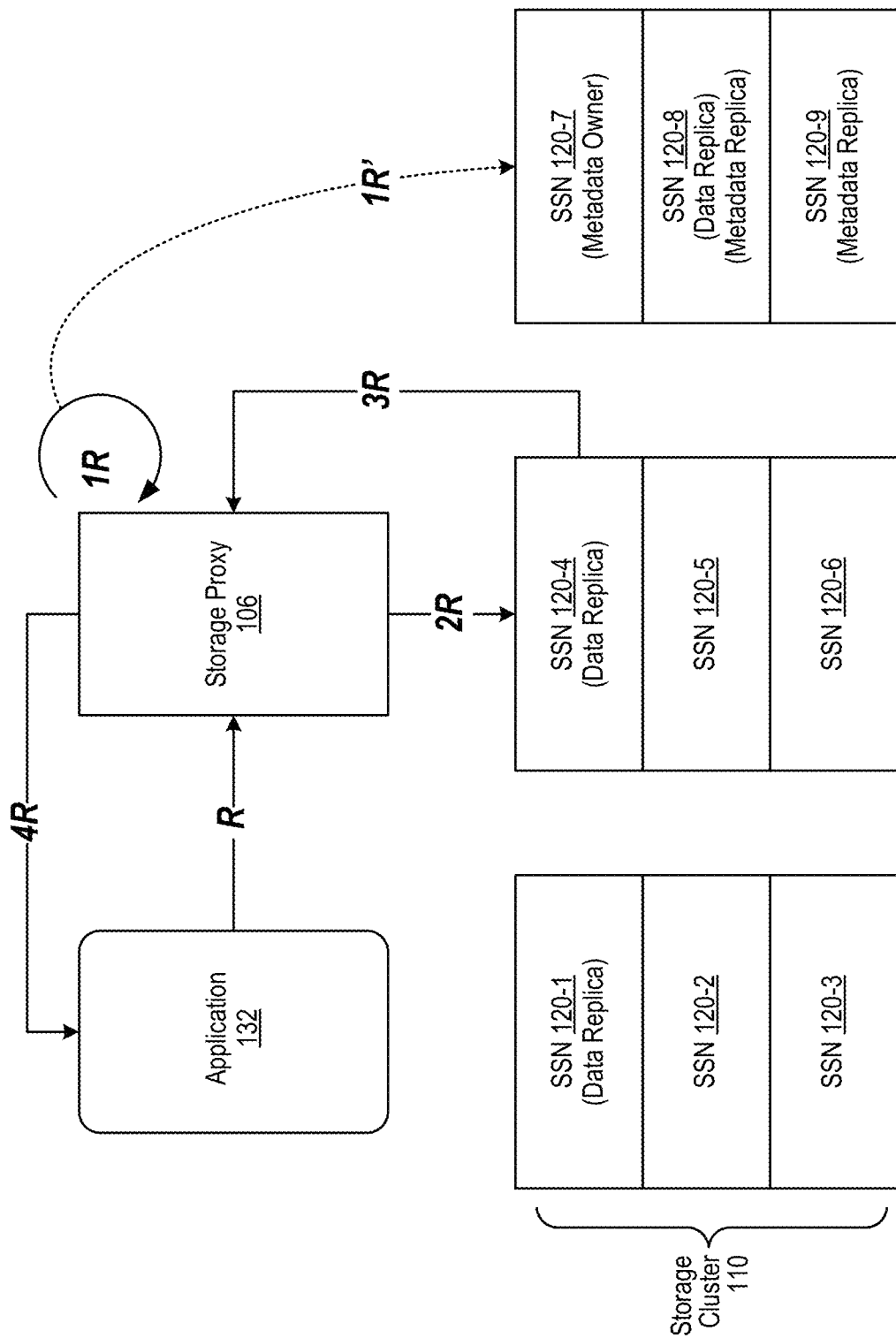
FIG. 1F is a block diagram depicting a typical I/O workflow for read operations originating with an application.

FIG. 1F is a block diagram depicting a typical I/O workflow for read operations originating with an application. This figure depicts an application 132 reading from storage cluster 110, illustratively reading from a virtual disk 170 configured with RF3.

At step R, storage proxy 106 intercepts a read request issued by application 132 for one or more data blocks from a virtual disk 170 in storage cluster 110. At step 1R, storage proxy 106 queries the local metacache for a particular data block to be read and if the information is not found in the local metacache, at step 1R' storage proxy 106 consults metadata subsystem 140 (e.g., at the vdisk's designated metadata owner node 120-7). At step 2R, storage proxy 106 sends the data block details to one of the closest data storage subsystems 150, based on observed latency, e.g., storage service node 120-4. At step 3R, the data storage subsystem 150 reads the data block(s) and transmits the block(s) back, if found, to storage proxy 106. If the read operation fails due to any error, the read is attempted from another replica. At step 4R, storage proxy 106 serves the requested data block(s) to application 132. If client-side caching is enabled for the targeted virtual disk 170 during provisioning, the storage proxy 106 queries the local block cache at step 1R to fetch the data block(s), and if found therein serves the data block(s) to application 132 at step 4R, thereby bypassing the data storage subsystem 150 at the storage service nodes(s) and eliminating the need to traverse the network to reach storage cluster 110.

System Resiliency. System 100 is designed to survive disk, node, rack, and data center outages without application downtime and with minimal performance impact. These resiliency features include: high availability, non-disruptive upgrades (NDU), disk failures, replication, and snapshots and clones.

High Availability. A preferable minimum of three storage service node should be provisioned for an implementation of the illustrative system. Redundancy can be set as agnostic, at the rack level, or at data center level. The system initiates transparent failover in case of failure. During node, rack, or site failures, reads and writes continue as usual from/to remaining operational replicas. To protect against a single point of failure, storage proxies 106 install as a high availability active/passive pair ("HA pair," not shown). A virtual IP address (VIP) assigned to the HA pair redirects traffic automatically to the active storage proxy 106 at any given time. If one storage proxy 106 instance is lost or interrupted, operations fail over seamlessly to the passive instance to maintain availability. This happens without requiring intervention by applications, administrators, or users. During provisioning, administrators can indicate that an application host 102/121 will use a clustered file system. This automatically sets internal configuration parameters to ensure seamless failover when using VM migration to a secondary physical host running its own storage proxy 106. During live VM migration, such as VMware vMotion or Microsoft Hyper-V, any necessary block and file storage "follows" guest VMs to another host.

Non-Disruptive Upgrades (NDUs). The illustrative system supports non-disruptive software upgrades by staging and rolling the upgrade across individual components using the highly available nature of the platform to eliminate any downtime or data unavailability. Storage service nodes 120 and storage services 122 undergo upgrades first one node at a time. Meanwhile, any I/O continues to be serviced from alternate available nodes, e.g., replicas. Storage proxies 106 are upgraded next, starting with the passive storage proxy in HA pairs. After the passive storage proxy upgrade is complete, it is made active, and the formerly active storage proxy 106 is upgraded and resumes service as the passive of the HA pair. This process eliminates any interruption to reads or writes during the upgrade procedure.

Disk Failures. The illustrative system supports efficient data and metadata rebuilds that are initiated automatically when there is a disk failure. Payload data is rebuilt from other data replicas and using information in the metadata subsystem. The metadata rebuild self-heals within the metadata service.

Replication. The illustrative system uses a combination of synchronous and asynchronous replication processes to distribute and protect data across the cluster and provide near-zero recovery point objectives (RPO) and recovery time objectives (RTO). For example, two of three replicas are written synchronously, and one is written asynchronously. The system supports any number of active data centers in a single storage cluster 110, using a tunable replication factor and replication policy options. The replication factor designates the number of replicas to create for each virtual disk, and the replication policy defines the destination for the replicas across the cluster. Replicas occur at the storage container level of a virtual disk 170. For example, if a 100 GB virtual disk with RF3 is created, the entire 100 GBs are not stored as contiguous chunks on three storage service nodes. Instead, the 100 GBs are divided among several storage containers, and replicas of each storage container are spread across different storage pools on different storage service nodes within the storage cluster. For additional disaster recovery protection against rack and data center failures, the illustrative system supports replication policies that span multiple racks or data centers using structured IP addressing, DNS naming/suffix, and/or customer-defined snitch endpoints. For "agnostic" replication policies, data is spread across the storage cluster using a best-effort to improve availability. For "rack aware" replication policies, data is spread across as many physically distinct racks as possible within in a single data center. For "data center aware" replication policies, data replicates to additional physical sites, which can include private and/or hosted data centers and public clouds. In a disaster recovery example, where the Replication Policy=Data Center Aware and the Replication Factor=3, the illustrative system divides the data into storage containers and ensures that three copies (RF3) of each storage container are spread to geographically dispersed physical sites, e.g., Data Centers A, B, and C. At any time, if a data copy fails, re-replication is automatically initiated from replicas across the data centers.

Snapshots And Clones. In addition to replication policies, data management tasks include taking snapshots and making "zero-copy" clones of virtual disks. There is no limit to the number of snapshots or clones that can be created. Snapshots and clones are space-efficient, requiring capacity only for changed blocks.

Encryption. The illustrative system provides software-based encryption with the Encrypt360 feature. This enables encryption of data at the point of ingestion (at the storage proxy 106). Data encrypted in this way remains protected in flight between storage proxy 106 and storage service nodes 120/storage service 122, in flight among storage service nodes as part of replication, in-use at storage proxy 106, and at rest while in storage. Any encryption scheme may be implemented, preferably 256-bit AES. Additionally, any third-party key management system can be attached.

Ecosystem Integration. The illustrative system works with and provides a secure data storage system for a variety of data-generating platforms, including systems that generate primary (production) data and systems that generate backup data from primary sources. VMware. The illustrative system features a vCenter plug-in that enables provisioning, management, snapshotting, and cloning of virtual disks 170 directly from the vSphere Web Client. Additionally, the system incorporates support for the VMware vSphere Storage APIs Array Integration (VAAI). Docker. The illustrative system provides persistent storage for Docker software containers through a volume plugin. The volume plugin enables a user to create a persistent Docker volume backed by a virtual disk 170. Different options, such as deduplication, compression, replication factor, and/or block size, may be set for each Docker volume, using "volume options" in the Docker Universal Control Plane (UCP) or using the "docker volume" command line. The virtual disk can then be attached to any host. The volume plugin also creates a file system on this virtual disk and mounts it using the path provided by the user. The file system type can also be configured by the user. All I/O to the Docker volume goes to virtual disk 170. As the software container moves in the environment, virtual disk 170 will automatically be made available to any host, and data will be persisted using the policies chosen during volume creation. For container orchestration platforms, such as Kubernetes and OpenShift, the illustrative system 100 provides persistent storage for software containers through a proprietary dynamic provisioner and via other technologies that interoperate with the orchestration platform(s). OpenStack. The illustrative system delivers block, file, and object storage for OpenStack all from a single platform via native Cinder and Swift integration. The system supports granular administration, per-volume (Cinder) or per-container (Swift), for capabilities such as compression, deduplication, snapshots, and/or clones. OpenStack administrators can provision the full set of storage capabilities of system 100 in OpenStack Horizon via OpenStack's QoS functionality. As with VMware, administrators need not use system 100's native web user interfaces and/or RESTful API, and storage can be managed from within the OpenStack interface.

Multitenancy. The illustrative system supports the use of rack-aware and data center-aware replication policies for customers who must satisfy regulatory compliance and restrict certain data by region or site. These capabilities provide the backbone of a multitenant architecture, which is supported with three forms of architectural isolation: LUN masking, dedicated storage proxies, and complete physical isolation. Using the LUN masking option, different tenants are hosted on a shared infrastructure with logical separation. Logical separation is achieved by presenting virtual disks only to a certain VM and/or physical application host (IP range). Quality of Service (QoS) is delivered at the VM level. Using the dedicated storage proxies option, storage access is provided with a dedicated storage proxy 106 per tenant. Storage proxies can be deployed on a dedicated physical host or a shared host. This provides storage as a shared infrastructure, while compute is dedicated to each tenant. Quality of Service (QoS) is at the VM level. Using the complete physical isolation option, different tenants are hosted on dedicated storage clusters (each running their own storage service and storage proxies) to provide complete logical and physical separation between tenants. For all of these multitenant architectures, each tenant can have unique virtual disks with tenant-specific storage policies, because the illustrative system configures policies at the virtual disk level. Policies can be grouped to create classes of service (CoS).

Thus, the illustrative distributed data storage system scales seamlessly and linearly from a few nodes to thousands of nodes using virtual disks as the user-visible storage resource provided by the system. Enterprise storage capabilities are configurable at the virtual disk level. The storage service nodes can be configured in a plurality of physical computing environments, e.g., data centers, private clouds, and/or public clouds, without limitation.

Commissioning and Decommissioning Metadata Nodes

FIG. 2 is a block diagram depicting some details of and interoperability among metadata nodes and pod subsystems according to an illustrative embodiment. This figure depicts: metadata node 140-1 in communication with pod subsystem 130-1 (likely but not necessarily executing on the same storage service node as metadata node 140-1); and metadata node 140-2 in communication with pod subsystem instance 130-2 (likely but not necessarily executing on the same storage service node as metadata node 140-2). Pod subsystem instance 130-1 comprises an instance of barrier 201, e.g., 201-1. Pod subsystem instance 130-2 comprises another instance of barrier 201, e.g., 201-2. Metadata node 140-1 comprises: metadata synchronization logic 212-1; metadata commissioning and decommissioning logic 214-1; coverage tracker 219-1, and a plurality of metadata files 229-1 in the form of column families associated with keys in the range owned by metadata node 140-1. Metadata node 140-2 comprises: metadata synchronization logic 212-2; metadata commissioning and decommissioning logic 214-2; coverage tracker 219-2, and a plurality of metadata files 229-2 in the form of column families associated with the keys in the range owned by metadata node 140-2. Bidirectional arrows (1)-(4) also are depicted. The depicted elements are shown here to highlight certain aspects that will enhance the reader's understanding of the present disclosure, but do not necessarily include all the functionality of metadata subsystem 140 or pod subsystem 130.

This figure depicts only one pair of metadata nodes 140 and one pair of pod subsystem instances 130 to illustrate metadata being copied unidirectionally from one node to another node, as depicted by arrow (4), but the invention is not so limited. In other embodiments, first metadata is copied from a first node to another node and second metadata is copied from the second node to the first node, depending on how the range ownership and replica assignments have been adjusted. In some embodiments, metadata may be copied from one node to a plurality of other nodes, without limitation. The disclosed techniques are suitable for any combination and permutation of metadata copying among new and old metadata nodes. Copying of metadata to replicas of the metadata nodes is not shown here, but occurs as a matter of course in the commissioning and/or decommissioning transition. Each metadata file has at least one replica copy at another (replica) metadata node so that every metadata file is replicated according to the governing replication factor (e.g., RF3). Thus, copying of metadata between nodes includes old view and new view replica nodes in order to maintain the replication scheme.

Metadata node 140-1 is depicted here as an old owner or current/old node. Metadata node 140-2 is depicted here as a new owner or new/next node such that its new range overlaps in whole or in part with the range owned by metadata node 140-1. Thus, at least some of metadata 229-1 at old owner 140-1 will move to new owner 140-2 as shown by arrow (4).

Figure 3A:
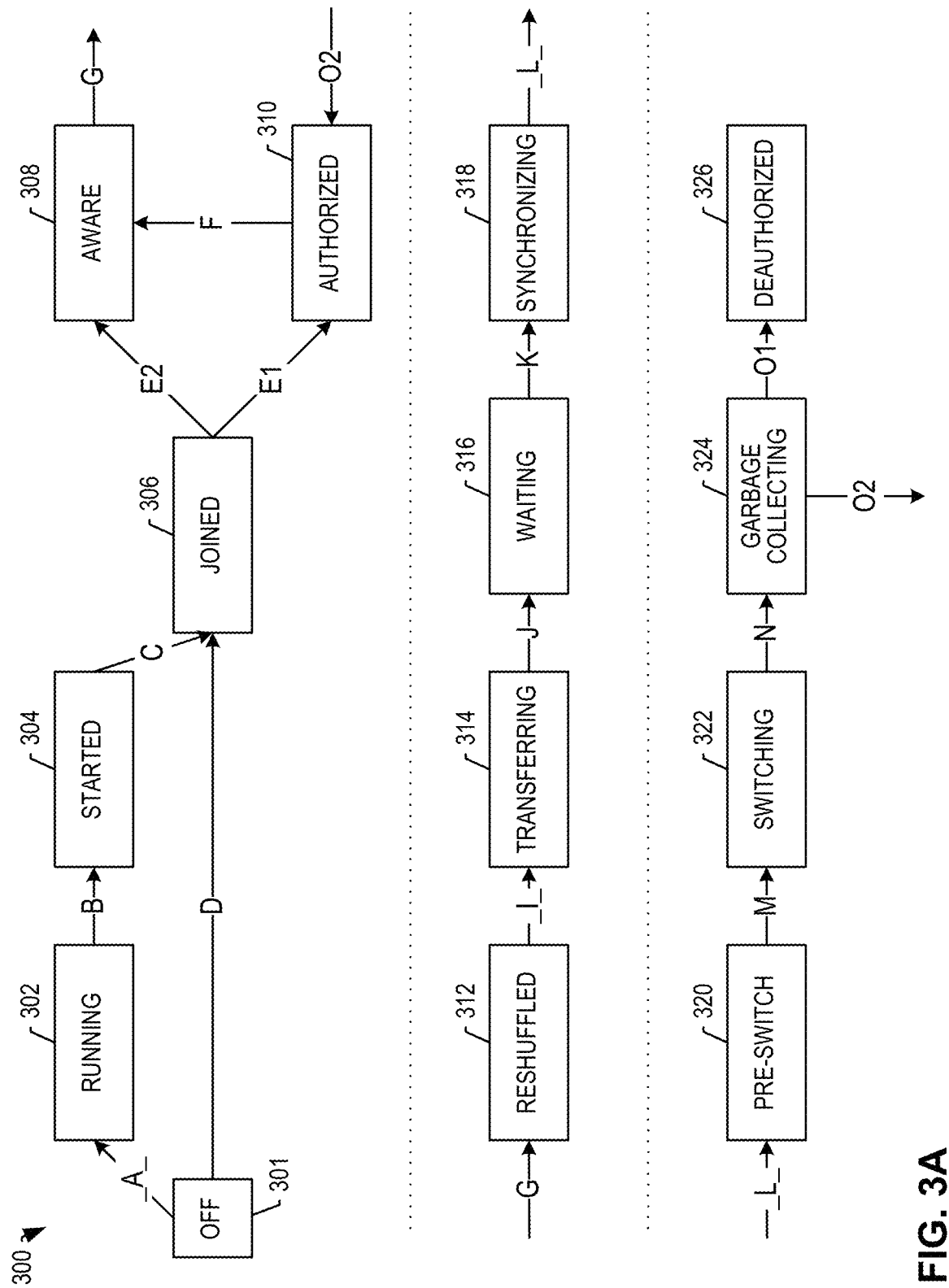
FIG. 3A depicts a state machine managed by the illustrative distributed barrier logic (a/k/a View Change Barrier) according to an illustrative embodiment.

Barrier 201 (e.g., instances 201-1, 201-2) executes within pod subsystem 130, i.e., pod subsystem 130 operates barrier 201 and keeps the barrier instances synchronized across various storage service nodes that host pod subsystem 130. As noted, the role of barrier 201 is to enable and control the transition of metadata nodes within the distributed data storage system from state to state. An example of the states controlled by barrier 201 is shown in FIG. 3A. Each metadata node maintains a local state according to the same states shown in FIG. 3A. The local state may progress asynchronously relative to the pod-based barrier 201, but ultimately, barrier 201 opens each gate only when barrier 201 knows that all participating metadata nodes have completed certain predicate or prerequisite steps. The asynchronous approach is advantageous, because metadata commissioning/decommissioning will not substantially stress the processing resources of the system, but it may in some circumstances hold up a new view change until a preceding one is completed. The pod subsystem 130 forms a synchronized network within distributed data storage system 100 as described for example in U.S. Pat. No. 9,483,205 B2. Likewise, instances of barrier 201 operating in various instances of pod subsystem 130 executing on storage service nodes 120 communicate with each other as shown by arrow (1) in the present figure. This enables barrier 201 to maintain a current status of the state machine across distributed data storage system 100. Barrier 201 is shown here as a distinct functional component of pod subsystem 130 to ease the reader's understanding of the present disclosure, but barrier 201 may be implemented in any suitable way within pod subsystem 130, without limitation and need not be embodied as depicted here.

Metadata synchronization logic ("anti-entropy engine" or "AE") 212 (e.g., 212-1, 212-2) executes within metadata subsystem 140. AE 212 compares replicas of metadata across metadata nodes and ensures that the replicas agree on a superset of the metadata therein to avoid losing metadata. During storage and compaction of metadata-carrying string-sorted tables (SSTs) ("metadata files" or "metadata SST files"), a consistent file identification scheme is used across all metadata nodes for the metadata files. When an application node writes to and reads from a virtual disk on the distributed data storage system, metadata is generated and stored in the metadata replica nodes. A modified log-structured merge tree is used to store and compact the metadata SST files. A fingerprint file for each metadata SST file includes a start-length-hash value triple for each region of the metadata SST file. To synchronize, fingerprint files of two metadata SST files are compared, and if any hash values are missing from a fingerprint file then key-value-timestamp triples corresponding to these missing hash values are sent to the metadata SST file that is missing them. An example of metadata synchronization logic 212 is described in U.S. Pat. No. 10,740,300.

In regard to commissioning and decommissioning of metadata nodes, AE 212 is responsible for replicating metadata 229 at metadata nodes 140 according to new range ownership, and continues replicating until the coverage tracker 219 for the receiving metadata node is empty, indicating completion of the copying task. In sum, AE 212 synchronizes metadata among old and new replica sets. See also FIG. 3A and accompanying text.

Metadata commissioning and decommissioning logic 214 (e.g., 214-1, 214-2) executes within metadata subsystem 140. Logic 214 is responsible for the operations occurring at metadata subsystem 140 in the course of a commissioning or decommissioning process, unless otherwise noted. Logic 214 keeps locally the state of the transition process. This state controls which operations may be performed to advance the transition process to a next state in the barrier's state machine. As shown by arrows (2) and (3), logic 214 communicates with barrier 201 to receive notice of gate openings, to transmit operational status, such as reporting that operations for the current state are completed, and to receive acknowledgments (e.g., "callbacks") confirming that distributed barrier logic 201 received the status reporting from the present node and from other nodes, etc. Confirmation callbacks from barrier 201 are important in some states, because they tell the metadata node that all other metadata nodes have reached a certain state or accomplished a certain task, such as finished copying metadata files to new owner nodes. More details are given in FIG. 3A. Logic 214 also communicates within the metadata node 140 with AE 212 and with coverage tracker 219. Logic 214 may comprise a so-called "rangelet manager" function that maps keys, ranges, tokens, and node ownership, to determine which metadata node is responsible for each key. The rangelet manager at each metadata node may maintain data structure(s) of the mapping, such as an old view map and a new view map (not shown here). In some embodiments, rangelet managers operate outside logic 214 and within metadata node 140, without limitation.

Coverage tracker or coverage map 219 (e.g., 219-1, 219-2) keeps track of which metadata files 229 need to be requested from other metadata nodes in order to properly populate the present metadata node according to the new view of range ownership, and dynamically tracks progress of whether requested metadata has been received from the other nodes. Coverage tracker 219 may be implemented as a data structure maintained by logic 214 and/or by AE 212. In some embodiments, coverage tracker 219 includes logic that maintains a data structure based on information received from logic 214 and/or from AE 212. In some embodiments, the illustrative coverage tracker 219 includes information identifying replica nodes that carry particular metadata files (which are illustratively organized as column families in string-sorted tables (SSTs)) and the key ranges thereof. Regardless of implementation choices of coverage tracker 219, metadata node 140 generates and initializes a data structure comprising an index or listing of metadata file ranges 229 needed by the metadata node to become a new range owner, and identifies therein the metadata node replicas hosting these file ranges. As metadata files 229 are received at the present metadata node (e.g., 140-2), metadata node 140-2 (e.g., using logic 214-2 and/or AE 212) stores the received metadata files 229-2 locally at the metadata node and updates coverage tracker 219-2. In one embodiment, entries are removed from coverage tracker 219-2 after corresponding metadata file ranges 229-2 are received and stored at metadata node 140-2. Eventually, when all the metadata file ranges have been received, coverage tracker 219-2 will be empty, indicating completion of the present metadata copying cycle. Other embodiments use a different approach for tracking which metadata files are needed and received at a metadata node 140. An example of an operational coverage tracker or coverage map for recovering missing metadata files is given in U.S. Provisional App. 63/081,503 filed on Sep. 22, 2020 entitled "Anti-Entropy-Based Metadata Recovery In A Strongly Consistent Distributed Data Storage System."

Figure 2A:
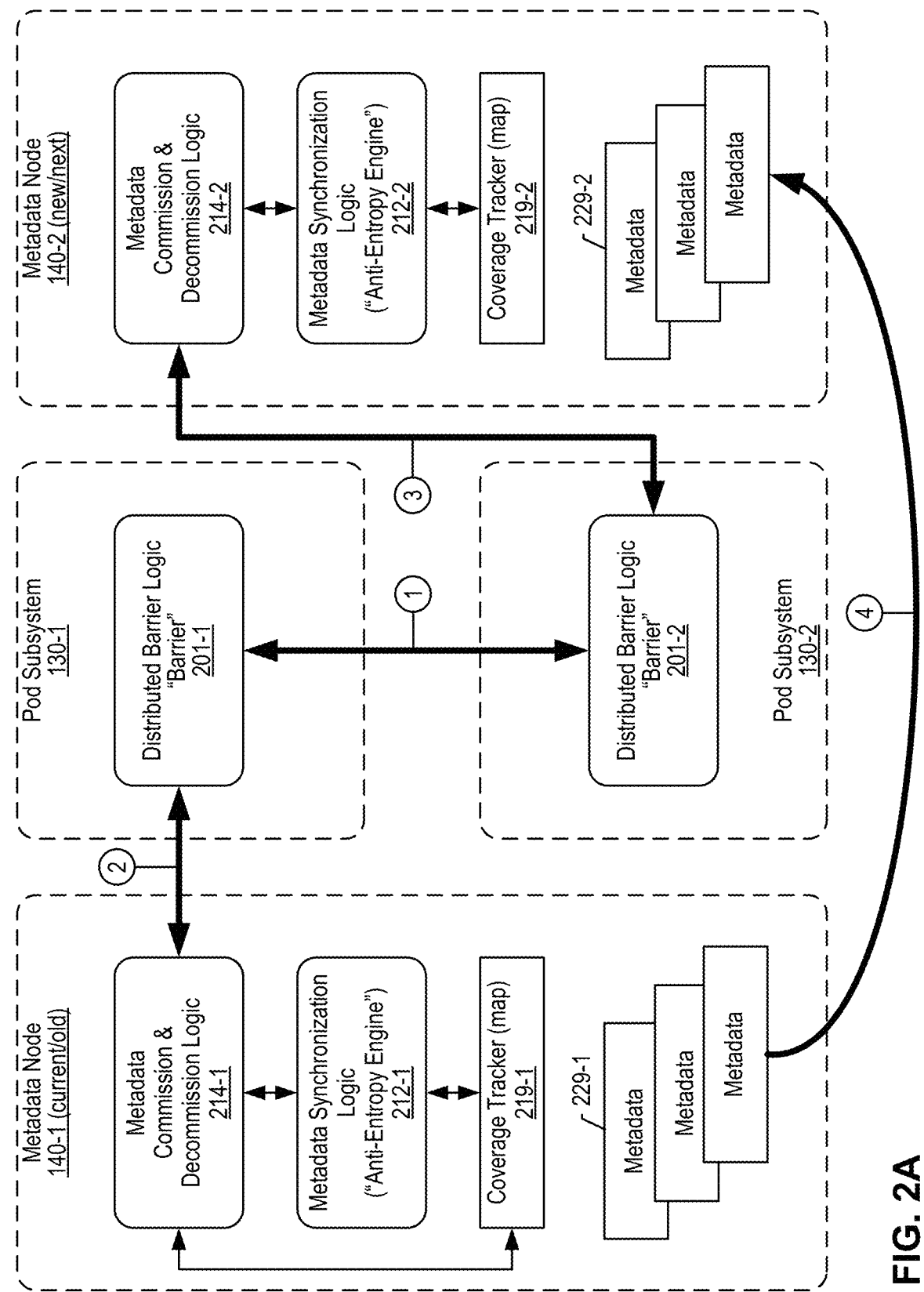
FIG. 2A is a block diagram depicting some details and interoperability of metadata nodes and pod subsystems according to an illustrative embodiment.
Figure 2B:
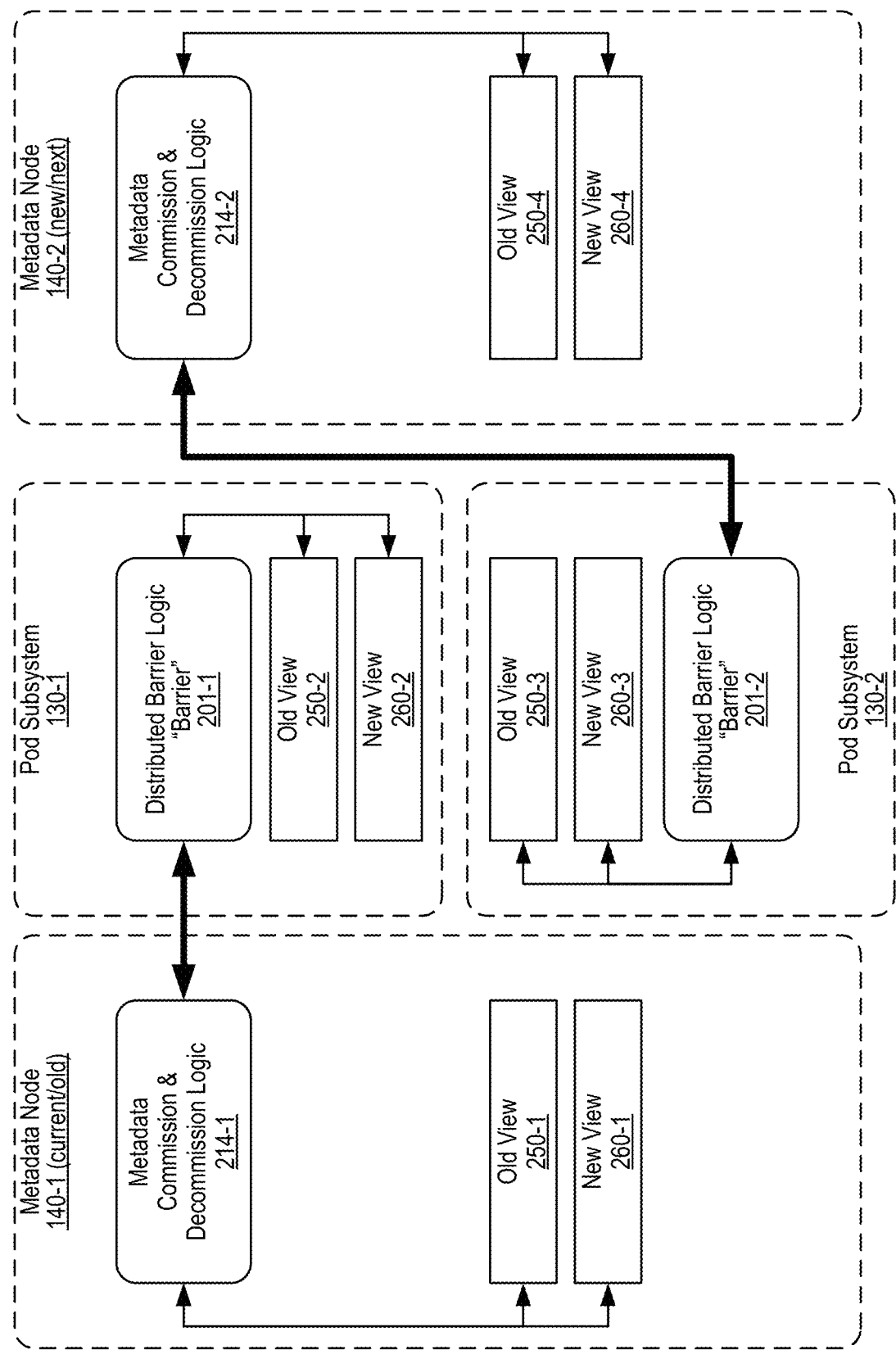
FIG. 2B is a block diagram depicting additional details and interoperability of metadata nodes and pod subsystems according to an illustrative embodiment.

FIG. 2B is a block diagram depicting additional details and interoperability of metadata nodes and pod subsystems according to an illustrative embodiment. In addition to the elements depicted in FIG. 2A, some of which are not shown here for the sake of simplicity, the present figure depicts an old view 250 (e.g., 250-1 ... 250-4, etc.) and a new view 260 (e.g., 260-1 ... 260-4, etc.) in each metadata node and pod subsystem. Barrier 201 generates the old view 250 and the new view 260, which it maintains throughout each commissioning and/or decommissioning process. Barrier 201 promulgates the old view 250 and the new view 260 to the metadata nodes, which enables the metadata nodes to properly dispose of reads and writes according to the table shown in FIG. 3B. Old view 250 and new view 260 are illustrative data structures that describe the distribution of range ownership in the system before the start of commissioning/decommissioning and afterwards, respectively.

FIG. 3A depicts a state machine 300 operated by the illustrative distributed barrier logic 201 according to an illustrative embodiment. The depicted states include: OFF, RUNNING, STARTED, JOINED, AUTHORIZED, AWARE, RESHUFFLED, TRANSFERRING, WAITING, SYNCHRONIZING, PRESWITCH, SWITCHING, GARBAGE_COLLECTING, and DEAUTHORIZED. (States 301-326). A metadata node 140 progresses through the depicted states as well. At each state, which is stored locally at the metadata node 140, different rules govern the behavior of the metadata node. More details on state-by-state I/O handling are given in FIG. 3B.

Transition steps between the states are: OFF to RUNNING=A; RUNNING to STARTED=B; STARTED to JOINED=C; OFF to JOINED=D; JOINED to AUTHORIZED=E1; JOINED to AWARE=E2; AUTHORIZED to AWARE=F; AWARE to RESHUFFLED=G; RESHUFFLED to TRANSFERRING=I (letter i); TRANSFERRING TO WAITING=J; WAITING to SYNCHRONIZING=K; SYNCHRONIZING to Pre-SWITCH=L; Pre-SWITCH to SWITCHING=M; SWITCHING to GARBAGE COLLECTING=N; GARBAGE COLLECTING to DEAUTHORIZED=O1; and GARBAGE COLLECTING to AUTHORIZED=O2.

The depicted state machine describes the state progression of the pod-based barrier 201 and the transitions undergone by metadata nodes 140 during the illustrative "view change" transition process. STARTED and RUNNING are reserved for future use. In the illustrative embodiments, new metadata nodes go straight to JOINED after being started or activated. In the first or initializing bootstrap of system 100, bootstrapping nodes go from JOINED to AUTHORIZED directly, but subsequently, once the distributed data storage system is up and running, bootstrapping nodes go from JOINED to AWARE. This happens because in the first bootstrap there is no metadata to move and therefore there no need to coordinate copying.

Transitions in the state machine are managed by barrier 201, which is a sequence of gates. When barrier 201 opens a gate, e.g., gate X, it notifies the participating metadata nodes 140. At this point, each of the participating metadata nodes has completed all tasks relating to state X, or else gate X would not have opened. Each node may then perform tasks of the X+1 state, even though that gate is as yet unopened. After receiving information from all the metadata nodes that each one has completed its X+1 tasks, barrier 201 opens gate X+1 and progresses towards X+2, repeating the process. Thus, after all participating metadata nodes inform barrier 201 that they completed their X+2 tasks, barrier 201 may open gate X+2. Thus, the global state (gate) advances only when all participating metadata nodes are ready for (or leaning on) the next gate. The barrier 201 deduces the global state of the system based on knowing the state of each participating node. Thus the global state is a reflection of the participating nodes' individual states and the global state may not advance until the participating nodes are all ready to advance. In order to transition or advance from state X to state X+1 according to the depicted state machine, a metadata node 140 in state X changes its local state to X+1 when it completes its state X tasks; then it informs barrier 201 that it is transitioning to state X+1, which is recorded in the barrier 201 and/or at pod subsystem 130. The metadata node 140 then calls the barrier 201 again to wait on the next gate X+1 until all the metadata nodes have done the same, in a blocking call (i.e., the blocking call ensures that metadata node 140 will not proceed to an even later state until the blocking call is returned by barrier 201). Once barrier 201 has received blocking calls from every metadata node 140, barrier 201 opens the next gate X+1 and returns the blocking calls (callbacks, or confirmation callbacks) to metadata nodes 140, letting metadata processes know that all the other processes (i.e., other affected metadata nodes) have successfully transitioned to state X+1. Given the asynchronous nature of the distributed data storage system, returning from the blocking call does not happen exactly at the same instant at different nodes. After getting the callback from the barrier, the node may stay in an existing state for a while before moving to the next one. This distinction is reflected by using a + (plus sign) while being in an existing state after receiving the callback from barrier 201. Thus, one metadata node may receive the callback from the barrier, perform the state-required tasks and be ready to move to the next state, while another metadata node may still be waiting for the callback. See also FIG. 3B.

The following is an overview of some operations involving barrier 201 and metadata nodes 140 at each transition step and/or while in each state of the state machine. The operations are recited from the point of a metadata node 140, unless otherwise stated. Because of the asynchronous nature of the interactions between nodes 140 and barrier 201 as explained above, a metadata node may be performing operations locally during a transition period between states officially sanctioned by barrier 201, e.g., K, M, etc. but before the barrier has opened the next gate.

A, B, C: reserved for future use. In some embodiments, metadata node 140 starts at transition step A, asks to join system 100 at transition step B, and receives authentication and authorization to join at transition step C.

D: a metadata node 140 that has been activated from the OFF state proceeds directly through automatic authentication to the JOINED state. This is a shortcut to authentication.

JOINED: a metadata node participates in gossiping and discovers the other metadata nodes in the distributed data storage system, along with their respective tokens and/or keys that they own (the owned key ranges). A new metadata node selects one or more tokens, each of which defines a certain range of keys that the new node claims, but the claim is not as yet honored by the system. In decommissioning, one or more existing metadata node(s) lay claim to range(s) of keys owned by the decommissioning node.

E1: on first system bootstrap, the initial set of metadata nodes are automatically commissioned and move to the AUTHORIZED state. At this point, the first system bootstrap is complete and therefore the metadata nodes can handle I/O as shown in FIG. 3B (e.g., row 353). The current_view=the set of newly authorized nodes, i.e., in the initial bootstrap the existing nodes become the current view. The rangelet managers are conjured at the participating metadata nodes. The rangelet managers are indexed by the tokens and point to the SSTables and memory tables related to the range. When a read comes in, the rangelet managers are consulted to determine which files and memtables to read, and when a write comes in, to determine the memtable to write to. In some embodiments, the metadata node conjures the rangelet managers on demand.

AUTHORIZED from E1 transition: barrier 201 is initialized here at pod subsystem 130, as triggered by new metadata node(s) joining and claiming one or more ranges of keys, or based on a decommissioning instruction entered for a metadata node. Because it acts as the controller of the commissioning and/or decommissioning process, which includes the re-distribution of key ownership, barrier 201 always maintains two views of the system: an old (current) view and a new (next) view, which may have new nodes added and/or some of the old ones removed. A metadata node that is in the AUTHORIZED state handles incoming read requests and write commands (I/O) according to the current view as shown in FIG. 3B. Rangelet managers are conjured (activated) at the metadata nodes (e.g., part of metadata commission and decommission logic 214-1, 214-2, etc.) to map keys to ranges and nodes, i.e., to maintain the view. The mapping or view associates keys with ranges, with tokens, and with owner nodes to provide information on which metadata node is responsible for which key.

F and E2: transition to AWARE state. Existing AUTHORIZED nodes change their local state to AWARE and inform barrier 201 they are AWARE. Likewise for any new metadata node(s) that joined.

AWARE: barrier 201 informs the metadata nodes that the transition process (a/k/a "view change") has started. A metadata node becomes aware of the two views of the system, i.e., old view and new view of range distribution. I/O handling as shown in FIG. 3B. The old view and new view will determine how each metadata node directs its reads and writes and which metadata nodes will handle or service reads and writes as shown in FIG. 3B. It should also be noted that each range of keys, whether old view or new view, has its own set of replica nodes, which may or may not overlap between old view and new view. Thus, a first node that owns several ranges may have different replica nodes for the different ranges. For example, in rack-aware configurations, replicas may be drawn from different racks in order to maximize diversity and resiliency. Likewise, in data center-aware configurations, replicas may be in different data centers. Thus, the set of replicas may be different for each range of keys. When barrier 201 has received AWARE notices from all the metadata nodes, i.e., they are leaning on the AWARE gate, barrier 201 opens the AWARE gate and moves to the next state, e.g., RESHUFFLED.

AWARE+: callback received by metadata node from the barrier indicating that barrier 201 is in the next state, e.g., RESHUFFLED, but the metadata node has not moved to next state as yet. I/O handling same as AWARE.

G: transition to RESHUFFLED state.

RESHUFFLED: Rangelet managers are reconjured at the metadata nodes to include the new view information (reshuffling). Reconjuration conjures rangelet managers corresponding to ranges for which the metadata node has become an owner or replica. Each metadata node, including every replica, is in possession of old view (old range owners) and new view (new range owners), and therefore may accept handling of new write commands to the new range owners. Metadata nodes inform barrier 201 that reshuffling is completed, i.e., each metadata node is in possession of new view and old view. I/O handling as shown in FIG. 3B.

RESHUFFLED+: callback received by metadata nodes from the barrier indicating that barrier 201 is in the next state, e.g., TRANSFERRING, but metadata nodes have not moved to the next state as yet. I/O handling same as RESHUFFLED.

I: at this point, every metadata node knows that every metadata node (including itself) has performed the reshuffling of range owners. Transition to TRANSFERRING state.

TRANSFERRING: I/O handling as shown in FIG. 3B. Each metadata node, having both old view and new view of range ownership, evaluates every incoming metadata write command and transforms the write command into two write commands; transmits a first write command to the old view set of replica nodes and transmits a second write command to the new view set of replica nodes. Accordingly, the new replica sets begin to be populated with new metadata writes.

TRANSFERRING+: I/O handling same as TRANSFERRING. Metadata nodes wait for in-flight requests to arrive at metadata nodes and in-memory data is flushed to disk at the metadata nodes. On-disk metadata related to ranges that have been split by the reshuffling is copied and assigned to the new range owners (hardlinking). Metadata nodes perform "hardlinking" here, i.e., after first persisting all metadata to disk, copy metadata files from old names associated with the old ranges to new names associated with the new ranges. In hardlinking, the metadata files are not copied (yet) but new pointers are created to the same data as if they were new metadata files. When hardlinking is completed, each metadata node reports completion to barrier 201. To avoid circularity, certain metadata cannot be moved using anti-entropy logic (see WAITING+), thus, fingerprint files corresponding to metadata SSTables (illustratively, the fingerprint files are also in the form of SSTables) are individually read from the source node and written to the destination replicas instead of using anti-entropy techniques. Because these fingerprint files are written to both old and new nodes, they can be used by the anti-entropy logic for the corresponding metadata SSTables.

J: Each metadata informs barrier 201 that it is transitioning to WAITING state.

WAITING: I/O handling as shown in FIG. 3B. Metadata nodes await callback from barrier 201.

WAITING+: I/O handling same as WAITING. At this point, every metadata node knows that every node has finished hardlinking. Barrier 201 asks all metadata nodes to ask (query) other nodes what metadata files the asking nodes should be copying to themselves according to the new view. Thus, each metadata nodes asks the old replicas what metadata files to copy from old replica to new replica and populates its coverage trackers accordingly. Each metadata node uses its anti-entropy logic to replicate metadata at replica nodes according to the new range ownership until every coverage tracker is empty (i.e., copying is complete).

K: After its coverage tracker is empty, each metadata node informs barrier 201 it is transitioning to the SYNCHRONIZING state.

SYNCHRONIZING: I/O handling as shown in FIG. 3B.

SYNCHRONIZING+: callback received by metadata nodes from the barrier indicating that barrier 201 is in the next state, e.g., PRE-SWITCH, but metadata nodes have not moved to the next state as yet. I/O handling same as SYNCHRONIZING.

L: At this point every metadata node knows that every metadata node has finished anti-entropy. Although the process at a given metadata node received a callback from barrier 201, other nodes may still be waiting on that callback. The given metadata node has completed copying of metadata files to itself as a new range owner and thus reads can be reliably served by it as a new range owner. Transition to PRE-SWITCH state.

PRE-SWITCH: I/O handling as shown in FIG. 3B. Read requests are directed to new range owners/replicas, but because some of the other metadata nodes may not have received callback from barrier 201 as yet, incoming reads are handled by both old and new owners/replicas. The aim here is ultimately to stop serving reads from metadata nodes according to the old view. PRE-SWITCH+ makes this change possible.

PRE-SWITCH+: callback received by metadata nodes from barrier 201 indicating that all nodes have completed PRE-SWITCH state. At this point, every metadata node knows that every node knows that every metadata node has its coverage trackers empty. Thus it is okay now for old nodes to stop honoring read requests. Wait for in-flight operations to land. I/O handling as shown in FIG. 3B (different from PRE-SWITCH state).

M: The difference between transition M and transition L is important. In the SYNCHRONIZING state, reads are directed to the old view nodes and a node that is in PRE-SWITCH, before the callback, has to keep handling reads for its old ranges. Once a node reaches PRE-SWITCH+, it knows that all other nodes are at least in PRE-SWITCH, so no more reads for old views will be arriving and it can prepare to drop the old view information. Transition to SWITCHING state.

SWITCHING: I/O handling as shown in FIG. 3B. Write commands are directed only to new nodes, but an old node that receives the write request may still honor it. The aim here is ultimately to stop handling writes at old metadata nodes according to the old view. SWITCHING+ makes this possible.

SWITCHING+: callback received by metadata nodes from barrier 201 indicating that all nodes have completed SWITCHING state. Thus it is okay now for old nodes to stop honoring write commands. I/O handling as shown in FIG. 3B (different from SWITCHING state), i.e., all I/O handled exclusively according to the new view.

N: At this point the new view, with the adjusted range ownership takes effect as the current view of the system, which is no longer in transition. Commissioning and decommissioning are effectively completed at this point, as metadata nodes forget the old_view by making old_view=new_view. Metadata nodes prepare for GARBAGE COLLECTING state by pausing anti-entropy.

GARBAGE COLLECTING (GC): Anti-entropy is stopped as garbage collection schedules out-of-date metadata of the old view for ultimate deletion from the old node. I/O handling as shown in FIG. 3B. After the metadata nodes finish garbage collecting, each metadata node sends notice to barrier 201. When barrier 201 has GC notices from all the metadata nodes, i.e., they are leaning on the GC gate, barrier 201 opens the GC gate.

GARBAGE COLLECTING+: callback received by metadata nodes from the barrier, indicating that the GC gate is open, but metadata nodes have not moved to next state as yet. I/O handling same as GC state.

O1: decommissioned nodes transition to DEAUTHORIZED state.

DEAUTHORIZED: Metadata nodes that have been decommissioned reach a dead-end state, which requires their identity to be scrubbed before they can rejoin the system. No I/O to/from DEAUTHORIZED nodes. Decommissioned nodes forget all their tokens and ranges of keys, but retain their SID. Since SIDs may not be re-used, a decommissioned node needs a new SID to be recommissioned into the system.

O2: commissioned and working nodes transition to AUTHORIZED state.

AUTHORIZED reached via O2 transition: Reset barrier 201. Metadata nodes that joined or remained in the system move back to the state where they can participate in new view changes. Resume anti-entropy logic for ongoing metadata synchronization. I/O handling as shown in FIG. 3B.

As nodes progress through states, the set of metadata nodes targeted for Read and Write requests for a certain key will change based on changes to range ownership. The table in FIG. 3B describes how the I/O handling changes through the states.

View Change Barrier 201 (a/k/a "distributed barrier logic" or "barrier"). The View Change Barrier 201 synchronizes the transitions of metadata processes around the state machine loop. The following states are defined in an example quexapod.thrift file in pod subsystem 130: RUNNING, STARTED, JOINED, AUTHORIZED, AWARE, RESHUFFLED, TRANSFERRING, WAITING, SYNCHRONIZING, PRESWITCH, SWITCHING, GARBAGE_COLLECTING, and DEAUTHORIZED. In a non-limiting example embodiment that uses Apache Zookeeper™ (ZK) from the Apache Software Foundation, barrier information is stored in a /VIEW_CHANGE/BARRIER path, where for each state there is a child znode. The barrier is initialized all closed and with no processes being expected on any gate. This is done by setting the contents of /VIEW_CHANGE/BARRIER to "0" and ensuring that no state znode has any children. At this point, the barrier is in the AUTHORIZED state since all nodes already bootstrapped are in the AUTHORIZED state.

When a bootstrap starts, the number of nodes being bootstrapped (which are all in JOINED state) plus the number of nodes already bootstrapped (which are all in AUTHORIZED state) is set in the barrier. This means that the gates will open only once these many nodes lean on them. Leaning is defined herein as meaning that all the participating metadata nodes that are traversing the state machine must reach a certain state S before the corresponding gate S opens and moves to the next state S+1 in the state machine loop. Thus, when the barrier is at gate S+1, this fact implies that all the participating metadata nodes successfully reached state S+, completed tasks associated with state S+, and therefore are ready for the next gate S+1. Gate S+1 cannot be opened if some of the participating nodes are lagging, and the barrier will wait for such lagging nodes before opening the next gate. Also, for each metadata node participating in the transition procedure, information is stored in barrier 201 (e.g., a znode is created under each state of the barrier, with contents equal to "False" for each gate, indicating that the corresponding node is not leaning on the corresponding gate). The barrier also stores the current state of the metadata node 140 as reported by the metadata node. The information in the barrier is persistently stored in metadata subsystem 130, which enables failed metadata nodes 140 that fail during a commissioning or decommissioning process to resume operations from their last completed state, without having to replay the previously completed states or to start the commissioning or decommissioning from the beginning.

While the barrier waits for other inputs, the local process at a metadata node may execute actions to which the barrier is oblivious, such as completing tasks associated with the S state and the metadata node then advances locally to state S+1, which may include a change in I/O handling as shown in FIG. 3B. The metadata node notifies the barrier that it is locally in S+1 state so that the metadata node may recover thereto in case of failure. After the barrier gets all the signals from all the participating metadata nodes, the barrier opens the gate S+1 and informs the nodes; the metadata node then continues in that S+1 state while performing the operations needed to reach the next one.

Metadata nodes communicate with the distributed barrier logic 201 to receive gate and state information and they do not communicate with each other in that regard. Thus, each metadata node relies on information received from barrier 201 to infer what state other metadata nodes are in. For example, when metadata node X receives a callback from barrier 201 indicating that gate S+1 has opened, metadata node X correctly infers that all the other participating metadata nodes are at state S, or else barrier 201 would not have advanced from S to S+1. For some metadata operations, metadata node X needs to know that another metadata node Y: (a) has reached state S and (b) received the S+1 callback from barrier 201. The illustrative transition process uses a two-gate sequence with no special-purpose processing in between to achieve this knowledge transfer. Accordingly, when metadata node X receives the S+2 callback, it can correctly infer that the S+1 callback has been received by the other metadata nodes, including metadata node Y. Examples of this two-gate approach are used by the PRE-SWITCH and PRE-SWITCH+ states to stop old nodes from handling metadata reads. Likewise, SWITCHING and SWITCHING+ are used to stop old nodes from handing write requests. See also FIG. 3B.

Initially, bootstrapping and existing metadata nodes declare themselves to be AWARE of the commissioning by moving to the AWARE state (i.e., each node locally enters this state) and leaning onto the AWARE gate (on the barrier). Leaning is done through a blocking remote procedure call (RPC) to the barrier to set to "True" the contents of the calling metadata node for the corresponding gate. Once all required processes lean on this gate, the barrier opens and the blocking call returns, freeing the metadata node to change its state as needed to move to the RESHUFFLED state and so on to the following states. Once the GARBAGE_COLLECTING gate is open, all metadata nodes try to reset the barrier back to the AUTHORIZED state with zero processes waiting; one of the attempts will succeed, concluding the commissioning.

To properly support recovery from crashes, metadata nodes must remember (after a failure) which state they were in within the barrier's state machine loop. They do so by recording the last reached state in the pod subsystem 130, using the following illustrative proprietary API:

bool setNodeVCState(1:string node, 2:VCState vcState)—saves the ViewChange state last seen by the corresponding node.

VCState getNodeVCState(1:string node)—retrieves the state.

Initial Bootstrap or Commissioning. The initial bootstrap does not use the barrier to reach the AUTHORIZED state, because the barrier is needed to coordinate transitions of nodes through the states and to allow I/Os concurrently to the transfer of data from old to new replicas (based on changed range ownership). Since in the initial system commissioning there are no I/Os going on and no data to transfer, nodes are moved directly from JOINED to AUTHORIZED. The initial commissioning is triggered through an example authorize-cli.sh, using the authorizeall command, which authorizes all metadata nodes in the system known to the node receiving the command. The example authorizestatus command shows which nodes are known and in which states they are. For each node, the output also identifies how many view changes each node recognizes. Preferably, the initial commissioning can be performed only if at least three nodes are online in order to satisfy a minimum metadata replication factor of 3 (RF3). Each reported state of a metadata node is followed by a number. This is the BSID, which will be discussed later.

Subsequent Bootstraps (after the Initial Bootstrap). To commission new metadata nodes into a working "live" distributed data storage system, these new nodes must be started and given time to be seen by all metadata nodes in the distributed data storage system. These steps correspond to the transitions from states STARTED to JOINED. Again, command authorizestatus can be used to check the status of each node. Once all nodes to be bootstrapped are known, command authorizenew must be issued with a list of such hosts. When nodes come up, some time is needed for already authorized and non-authorized nodes to recognize each other through gossiping. Once they recognize each other, the authorization can start.

Decommissioning. The decommission of a node follows in the same general steps as the bootstrap process except that metadata is not moved from nodes already in the system to nodes being added, but instead moves from nodes being removed to nodes already in the system. The states nodes go through are the same as for bootstrap. At the end of the decommissioning, though, nodes being removed go to state DEAUTHORIZED. The corresponding SIDs, therefore, cannot be reused unless they are manually removed from the pod subsystem 130. Decommissioning is triggered by the illustrative command decommission, which also expects a comma-separated values (CSV) file or arguments with the names of nodes to be decommissioned. The deauthorized nodes remain in the DEAUTHORIZED state until some manual intervention either terminates them (e.g., "service hedvigpages stop") or resets them back to JOINED (e.g., remove the System.db file and restart the process). In the latter case (JOINED), the remaining metadata nodes will eventually recognize the node as a new node and allow it to be reauthorized with a new SID.

Bootstrap Identifier (BSID). Each view change cycle is uniquely identified by a number, the BSID. In pod subsystem 130, the example folder /VIEWCHANGE/HISTORY/DS_<BSID> records which nodes were added, removed, or ignored in the corresponding view change.

In an authorizestatus output, a number follows the state of each node reported. This is the BSID of the latest view change in which the node has taken part or recognizes. Upon completion of the initial bootstrap, nodes will have their BSID set to 0. Subsequent view changes will increase the BSID by 1. The BSID information is used by nodes to detect, upon restarts, if they have missed any changes with respect to intervening view changes. The information regarding BSIDs is stored into and recovered from the pod subsystem 130.

Splitting Ranges for Bootstrap. During bootstrap, R0 and R1' coexist and both receive the writes for R1. This ensures that in case of a rollback, R1 will have all the metadata written and that in case of success, R0 has all the metadata written. One complication for bootstrap is that tokens/ranges are randomly chosen by nodes upon their first startup. So the replicas for S0 may be in completely different locations from S1. However, if S1 has been chosen to ensure the metadata is placed in specific datacenters (datacenter awareness), then S0 must not break this requirement. Hence, when starting up new nodes in metadata node, these nodes check if a datacenter aware policy is in place and, if so, restrict their choice of tokens to the ranges that have as primaries the nodes in the same datacenter and the node being inserted.

Merging Ranges for Decommission. When merging ranges during decommission, R0 and R1 become R1. This approach introduces the following problem: if R0's primary is in datacenter DC0 and R1's is in DC1, then R0's data will be moved from DC0 to DC1. This will break datacenter awareness. The way to fix this is to not merge R0 to R1, to assign R0 to another node in DC0.

Wrap-around Range. Upon the first start, each metadata node chooses 64 tokens to own, which, except for one node, this implies 64 ranges. For the one node that chooses the smallest token t, the corresponding range would be from the largest token T, to MD5_MAX, to 0, to t. Although logically this is what happens, practically that node owns ranges T-MD5_MAX and 0-t, totaling 65 ranges. During view changes, we need to handle this extra range carefully because, differently from other ranges, it may change ownership if the smallest token in the ring changes. Also, for a short period of time, there will be two nodes with 65 ranges.

Hardlinking. SSTs are copied from one RangeletManager to another when view change happens. This is done by hardlinking the existing SST with a name corresponding to the destination range and adding the new SST to the RangeletManager. Because the original data has a history of flushes and compactions, leading for example, to SSTs having sizes in accord with their compaction levels, the system tries to preserve this information by hardlinking them with the same level. For splits, while hardlinking is happening, new data is coming into the new ranges, so flushes are also happening. It is possible that the desired hardlink gets used due to a flush before the hardlink itself happens. For merges, the destination range may already be using the desired hardlink name. In either case, a name collision results. This is solved by hardlinking the SST as a split of any existing SST.

Anti-Entropy (AE). After hardlinking, AE synchronizes metadata among old and new replica sets. Because I/Os may be going on, AE is ongoing, but still needs to ensure metadata existing before the view change has been properly synchronized. To do so, AE determines which SSTs existed in the system when the view change started and only deems the synchronizing complete once each of these SSTs or any resulting from compacting them, has been synchronized. In other words, we track whether all existing metadata has been covered by AE. Metadata written afterwards need not be tracked since it is written to both old-view and new-view replica sets. The tracking of the coverage is implemented by the CoverageTracker 219. For each node, the CoverageTracker is initialized with the list of SSTs that existed or were created during hardlinking that correspond to ranges the node replicates. Say that SSTs with compaction level equal to 1 and counter equal to 2 and 3 need to be tracked. These SSTs resulted from the compaction of SSTs from level 0, counters 8 to 15, so the range [8,15] is what the CoverageTracker remembers. Every time an SST is deemed synchronized by AE, if a view change is happening, the CoverageTracker is informed and the corresponding range is removed. Considering the previous example, suppose that SST level 1, counter 1, is synchronized. The tracker will then shrink the monitored range to [12,15]. Say that the level 1 SSTs get compacted into level 2, counter 0, and then AE synchronized it. Since this SST resulted from level 0 SSTs 0 to 15, once it is synchronized, the whole range gets cleaned from the tracker; once all tracked ranges are cleaned, the AE part of the view change is done.

Re-Adding A Decommissioned Node. Once a node is decommissioned, its Storage ID is permanently retired. However, to be sure that no new nodes could be mistaken for old ones, the VCState of the decommissioned node is set to DEAUTHORIZED and is not removed from the pod subsystem. Any node starting up with such a Storage ID will read this state from the pod subsystem and refuse to take I/Os. Thus, if a decommissioned node is to be recommissioned, for example as a way to implement elasticity in the system, it will have to do so with a new Storage ID (SID). In order to get a new Storage ID, the System.db file may have to be affirmatively deleted in the node.

Dealing with failures. The individual state of each metadata node is reported to and persistently stored at the pod subsystem. Advantageously, this architectural aspect enables metadata nodes that fail during a commissioning/decommissioning process to resume operations from their last completed state, without having to replay the previously completed states or to start the commissioning or decommissioning from the beginning. Thus, the incremental step-wise (or gate-by-gate) progress made by each metadata node is retained in the pod subsystem persistently, which provides a major improvement in the fault tolerance of the distributed data storage system even in the face of in-transition failures. Whenever a metadata node is started, it has to be able to continue whatever it was doing before stopping. This is true also for the view change process, which may or not have finished already. The node detects what is the situation by retrieving its view change state (VCState) and the last seen bootstrap ID (BSID) and comparing it with the state of the VCBarrier and last started/finished BSId. The first allows the node to realize if a view change was going on when it stopped and the latter allows it to see if that view change has ended (in which case the node needs to roll back or push forward). The exact process through which the recovery of state during a view change happens is better seen in code, but in general lines it corresponds to detecting if only soft state had changed so far (in which case the view change is restarted from scratch from the point of view of the node) or if hard state had changed, in which case the corresponding soft-state is recovered before the processing continues. Besides the VCState and BSId, the node also needs to know what nodes were being added/removed/ignored in the change, which is stored in the illustrative HISTORY folder in pod subsystem 130.

For example, a system has ten (10) metadata nodes participating in commissioning/decommissioning, e.g., node I-X. The BSID-related information indicates that the global state is S−1. When node I reports that it is at state S and the global state remains at S−1 so long as any of nodes II-X are still at state S−1. When all ten nodes report being at state S, the global state advances, thus reflecting the collective states of all the participating nodes. Suppose node II fails after reporting completion of state S. Pod subsystem 130 has persistently stored state S for node II, so when node II comes online again, it will not re-execute its state S tasks and will resume its state S, since it reported that state completed before it failed. On the other hand, if node II were to fail before reporting that it completed state S, then on re-activation it would resume operation at the preceding state S−1 and would have to re-execute its state S tasks.

FIG. 3B depicts a table that describes read and write handling by metadata nodes involved in a commissioning or decommissioning operation. As metadata nodes progress through states, the set of metadata nodes targeted for Read and Write requests for a certain key will change, as shown in rows 351-368. The table in FIG. 3B describes how the I/O handling changes through the states. The State column indicates the state of the metadata node as it is known to itself locally. On the left-hand side, columns indicate where the metadata node directs outgoing read requests and write commands, i.e., to the old range owner(s) or to the new range owner(s) or both. On the right-hand side, columns indicate which node actually takes responsibility for handling incoming read requests and write commands, i.e., the old range owner(s) or the new range owner(s) or both. At the end, during the SWITCHING+ state, the range ownership has been fully re-arranged and only the new range owners receive and handle reads and writes. Thus the "new" view becomes the final and current view, i.e., the new normal. At this point, the old metadata associated with the old range ownership can be forgotten and the nodes proceed to garbage collection and back to the authorized state where the barrier is reset. The DEAUTHORIZED nodes neither receive nor handle reads and writes as they are effectively excluded from the system.

The state in which a metadata node operates, i.e., its local state as shown here, overlaps with the state of barrier 201 at the pod subsystem, but is not synchronized therewith. Thus, a metadata node may locally change its state to a new state after reporting to barrier 201; or the node's local state may lag behind barrier 201 even after barrier 201 has moved to a new state. Once barrier 201 issues callbacks to metadata nodes indicating that all nodes completed state S, barrier 201 opens gate S and moves to state S+1.

Considering for example line 359, if a metadata node in state PRE-SWITCH receives a write request for key K, then the node forwards the request to the replica sets for K both in the old and the new view. If the request had been a read, then, since all the metadata has already been copied to the new view nodes at this point, only the new replica set is targeted. The write command is served by both old view and new view metadata owners of the K key and likewise the read request is served by both. This is because at this point in time, it is possible that in some lagging metadata nodes the old view node has the most current metadata for serving the read request. And the write request is handled by both old and new range owners until a later stage is reached, as shown in row 364.

Figure 4:
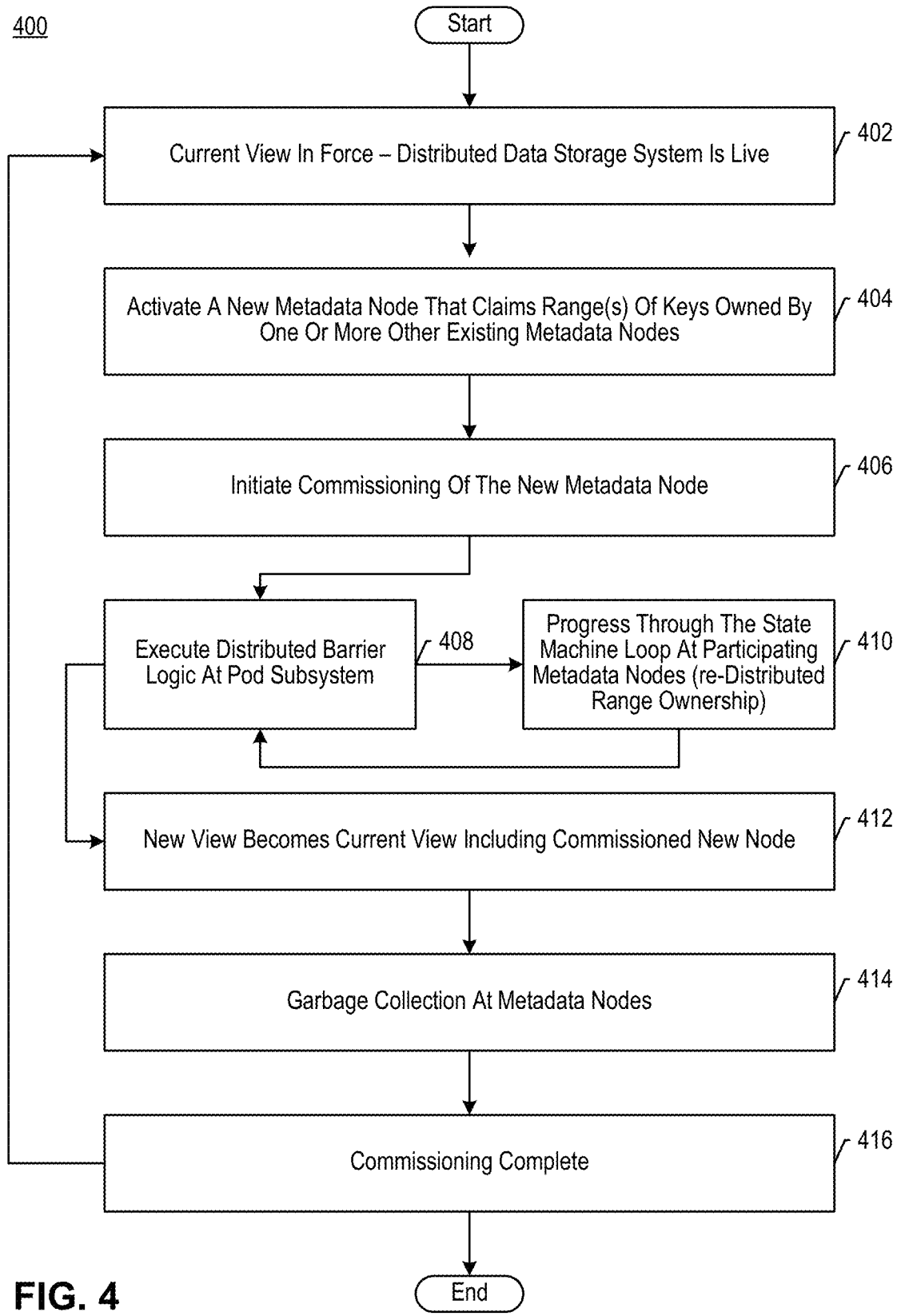
FIG. 4 is a flow diagram depicting a method 400 for commissioning a new metadata node within a running distributed data storage system.

FIG. 4 is a flow diagram depicting a method 400 for commissioning a new metadata node within a running distributed data storage system. Method 400 is performed by components of distributed data storage system 100, including storage service nodes hosting pod subsystem 130 and storage service nodes hosting metadata subsystem 140 (metadata nodes) that are affected by the commissioning, i.e., experience changes in range ownership.

At block 402, distributed data storage system 100 operates "live," handling payload data storage and retrieval, which is tracked by corresponding metadata. See also FIGS. 1A-1F. The current view is in force. At block 404, a new metadata node (e.g., 140-2) is activated in system 100. See also JOINED state in FIG. 3A. At block 406, on detecting that a new metadata node (e.g., 140-2) has joined the system, the barrier 201 initiates a commissioning process according to the state machine described in FIG. 3A.

At blocks 408 and 410 barrier 201 and metadata nodes 140 interoperate as they progress around the state machine described in FIG. 3A. As noted in the preceding figures and elsewhere herein, the process is highly interactive and is also asynchronous, as messages and signaling travel across the distributed data storage system. During this time, storage service nodes throughout system 100 support payload data reads and writes as well as metadata reads and writes without interruption of service. Metadata reads and writes are handled according to the table in FIG. 3B. At block 412, the new view becomes the current view of the system, which now includes the new metadata node (e.g., 140-2) as a fully functioning commissioned metadata node. See also state SWITCHING+ and transition N in FIG. 3A. At block 414, metadata nodes perform garbage collection, which sets up out-of-date metadata for deletion. See also GARBAGE COLLECTING in FIG. 3A. At block 416, the commissioning of the new metadata node (e.g., 140-2) can be considered complete and control returns to block 402, which operates according to the new view promoted to current view at block 412.

Figure 5:
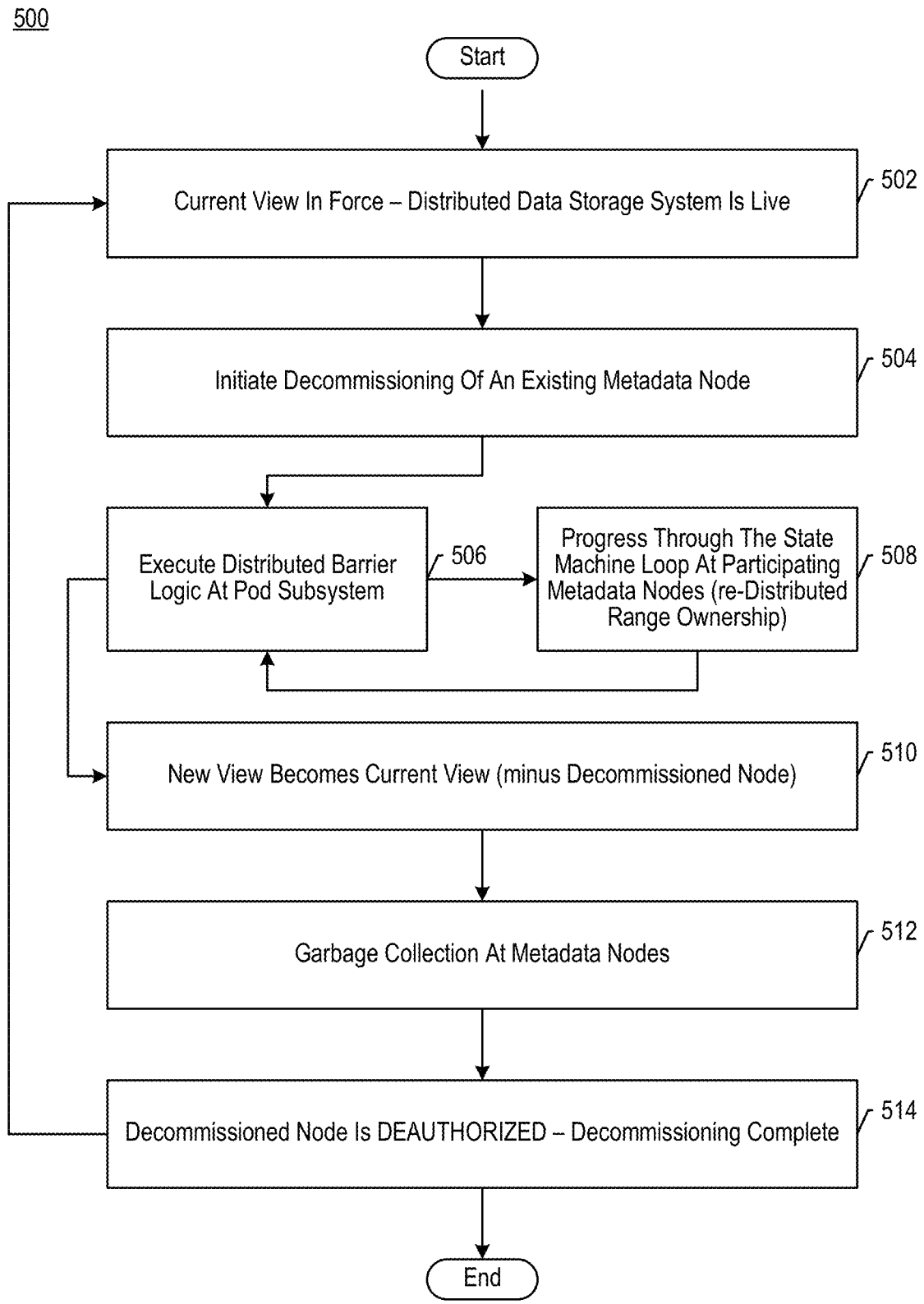
FIG. 5 is a flow diagram depicting a method 500 for decommissioning an existing metadata node within a running distributed data storage system.

FIG. 5 is a flow diagram depicting a method 500 for decommissioning an existing metadata node within a running distributed data storage system. Method 500 is performed by components of distributed data storage system 100, including storage service nodes hosting pod subsystem 130 and storage service nodes hosting metadata subsystem 140 (metadata nodes) that are affected by the decommissioning, i.e., experience changes in range ownership.

At block 502, distributed data storage system 100 operates "live," handling payload data storage and retrieval, which is tracked by corresponding metadata. See also FIGS. 1A-1F. At block 504, on detecting that a metadata node (e.g., 140-2) is being decommissioned, the barrier 201 initiates a decommissioning process according to the state machine described in FIG. 3A. At blocks 506 and 508 barrier 201 and metadata nodes 140 interoperate as they progress around the state machine described in FIG. 3A. As noted in the preceding figures and elsewhere herein, the process is highly interactive and is also asynchronous, as messages and signaling travel across the distributed data storage system. During this time, storage service nodes throughout system 100 support payload data reads and writes as well as metadata reads and writes without interruption of service. Metadata reads and writes are handled according to the table in FIG. 3B.

At block 510, the new view becomes the current view of the system, which now excludes the decommissioned metadata node (e.g., 140-2). See also state SWITCHING+ and transition N in FIG. 3A. At block 512, metadata nodes perform garbage collection, which sets up out-of-date metadata for deletion. See also GARBAGE COLLECTING in FIG. 3A. At block 514, the decommissioning of the metadata node (e.g., 140-2) can be considered complete and control returns to block 502, which operates according to the new view promoted to current view at block 510. The decommissioned node is now in the DEAUTHORIZED state as described in FIG. 3A.

In regard to the figures described herein and those included in the Appendices, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an example embodiment, a method for commissioning new metadata nodes into a working distributed data storage system that comprises a plurality of storage service nodes, comprises: by a first metadata node, receiving read requests and write commands for metadata that is associated with a first range of keys within a set of keys, wherein the first metadata node comprises a first storage service node that executes a metadata subsystem of the distributed data storage system, wherein the set of keys are unique identifiers that ensure strong consistency within the distributed data storage system, wherein each key of the set is owned by exactly one metadata node in the distributed data storage system, wherein the first metadata node: owns the first range of keys, and stores and maintains first metadata files at the first storage service node, and wherein each first metadata file is associated with the first range of keys; activating a second metadata node at a second storage service node that is distinct from the first storage service node, wherein on activation the second metadata node lacks metadata files associated with any of the keys in the set, and wherein the second metadata node comprises the second storage service node that executes the metadata subsystem of the distributed data storage system. The above-recited embodiment further comprising: by the second metadata node, claiming a second range of keys from the set, wherein the second range is part of the first range of keys owned by the first metadata node. The above-recited embodiment further comprising: executing a distributed barrier logic at one of the plurality of storage service nodes, wherein the distributed barrier logic controls a commissioning of the second metadata node into the distributed data storage system without interrupting servicing of read requests from and write commands to any of the plurality of storage service nodes, and wherein the commissioning re-distributes ownership of the set of keys among metadata nodes in the distributed data storage system.

The above-recited embodiment, further comprising: after the commissioning is complete, by the second metadata node, receiving read requests and write commands for metadata associated with the second range of keys, wherein first metadata files associated with the keys of the second range are stored at the second storage service node and maintained by the second metadata node. The above-recited embodiment, wherein a first instance of the distributed barrier logic is synchronized with other instances of the distributed barrier logic in the distributed data storage system, and wherein each instance of the distributed barrier logic executes in a pod subsystem that is distinct from the metadata subsystem that executes in the first metadata node and the second metadata node. The above-recited embodiment, further comprising: by the distributed barrier logic, initiating the commissioning of the second metadata node based on detecting the activating of the second metadata node. The above-recited embodiment, further comprising: by the distributed barrier logic, initiating the commissioning of the second metadata node based on detecting that the second metadata node claimed the second range of keys. The above-recited embodiment, wherein the commissioning re-distributes at least the first range of keys, based on the claiming of the second range of keys by the second metadata node, wherein during the commissioning, the second range of keys becomes owned by the second metadata node, and wherein other keys in the first range of keys remain owned by the first metadata node.

The above-recited embodiment, wherein the distributed barrier logic controls the commissioning of the second metadata node into the distributed data storage system by applying a state machine to control a progression of operations at the first metadata node and at the second metadata node without causing interruptions to servicing of read requests and write commands addressed to metadata files associated with the second range. The above-recited embodiment, wherein before the activating of the second metadata node the first metadata node operates according to a current view that indicates that the first range of keys is associated with the first metadata node, and wherein after the activating of the second metadata node, the first metadata node acquires a new view that indicates that the second range of keys is associated with the second metadata node and further indicates that other keys in the first range of keys remain associated with the first metadata node. The above-recited embodiment further comprising: completing the commissioning of the second metadata node after the distributed barrier logic informs the first metadata node and the second metadata node that the first metadata node and the second metadata node have successfully completed copying of metadata files associated with the second range of keys to the second metadata node, wherein the completing comprises discarding the current view and establishing the new view as the current view for operating the distributed data storage system. The above-recited embodiment, wherein the commissioning of the second metadata node comprises copying of first metadata files associated with the second range to the second metadata node, wherein the copying is performed by anti-entropy logic that executes in at least the second metadata node.

The above-recited embodiment, further comprising: by the distributed barrier logic, after the activating of the second metadata node: causing first metadata files that are associated with the second range to be copied from the first metadata node to the second metadata node; causing read requests addressed to metadata files associated with the second range to be served by at least the first metadata node until all of the first metadata files that are associated with the second range have been copied successfully to the second metadata node; and after all of the first metadata files that are associated with the second range have been copied successfully to the second metadata node, causing write commands addressed to metadata files associated with the second range to be directed only to the second metadata node and not to the first metadata node. The above-recited embodiment, further comprising: by the distributed barrier logic, after all of the first metadata files that are associated with the second range have been copied successfully to the second metadata node and to at least one replica of the second metadata node at an other storage service node of the plurality according to a replication factor: causing read requests addressed to metadata files associated with the second range to be served by the second metadata node and not by the first metadata node; and causing write commands addressed metadata files associated with keys in the second range to be serviced by both the first metadata node and the second metadata node until a callback is received by the first metadata node from the distributed barrier logic. The above-recited embodiment, further comprising: by the distributed barrier logic, while (a) all read requests addressed to metadata files associated with the second range are served by the second metadata node, and (b) all write commands addressed to metadata files associated with the second range are directed to the second metadata node and not to the first metadata node, and (c) all metadata nodes in the distributed data storage system are aware that all of the first metadata files that are associated with the second range have been copied successfully to the second metadata node: causing write commands addressed to metadata files associated with the second range to be serviced by the second metadata node and not by the first metadata node.

The above-recited embodiment, wherein the commissioning of the second metadata node into the distributed data storage system is completed when (i) all read requests addressed to metadata files associated with keys in the second range are served by the second metadata node and not by the first metadata node, and (ii) all write commands addressed to metadata files associated with keys in the second range are serviced by the second metadata node and not by the first metadata node. The above-recited embodiment, further comprising: after (i) all read requests addressed to metadata files associated with keys in the second range are served by the second metadata node and not by the first metadata node, and (ii) all write commands addressed to metadata files associated with keys in the second range are serviced by the second metadata node and not by the first metadata node, removing metadata files associated with keys in the second range from one or more of: the first metadata node and storage service nodes among the plurality that are not associated with the second range of keys. The above-recited embodiment, wherein the distributed data storage system comprises at least one replica of each metadata file that is associated with a key in the second range, at others of the plurality of storage service nodes that are distinct from the first storage service node and from the second storage service node. The above-recited embodiment, wherein a write command for metadata associated with the key in the second range serviced by the second metadata node is also serviced at one or more replica metadata nodes associated with the key in the second range, according to a replication factor of metadata nodes in the distributed data storage system.

According to another embodiment, a distributed data storage system comprising a plurality of storage service nodes, comprises: at least one storage service node that executes a distributed barrier logic, wherein the distributed barrier logic is configured to control a commissioning of a second metadata node into the distributed data storage system without interrupting servicing of read requests from and write requests to any of the plurality of storage service nodes, and wherein the commissioning re-distributes ownership of a set of keys among metadata nodes in the distributed data storage system; a first metadata node configured to receive read requests and write requests for metadata that is associated with a first range of keys within the set of keys, wherein the first metadata node comprises a first storage service node that executes a metadata subsystem of the distributed data storage system, wherein the set of keys are unique identifiers that ensure strong consistency within the distributed data storage system, wherein each key of the set is owned by exactly one metadata node in the distributed data storage system, wherein the first metadata node: owns the first range of keys, and stores and maintains first metadata files at the first storage service node, and wherein each first metadata file is associated with the first range of keys; the second metadata node at a second storage service node that is distinct from the first storage service node, wherein on activation the second metadata node lacks metadata files associated with any of the keys in the set, wherein the second metadata node comprises the second storage service node that executes the metadata subsystem of the distributed data storage system, and wherein the second metadata node is configured to claim a second range of keys from the set, wherein the second range is part of the first range of keys owned by the first metadata node; and after the commissioning is complete, the second metadata node is further configured to receive read requests and write requests for metadata associated with the second range of keys, and wherein first metadata files associated with the keys of the second range are stored at the second storage service node and maintained by the second metadata node. The above-recited embodiment, wherein the distributed barrier logic is configured to initiate the commissioning of the second metadata node based on one or more of: detecting that the second metadata node has been activated, and detecting that the second metadata node claimed the second range of keys. The above-recited embodiment, wherein the distributed barrier logic is configured to control the commissioning of the second metadata node into the distributed data storage system by applying a state machine to control a progression of operations at the first metadata node and at the second metadata node without causing interruptions to servicing of read requests and write requests addressed to metadata files associated with the second range.

According to yet another example embodiment, a method for decommissioning metadata nodes within a working distributed data storage system that comprises a plurality of storage service nodes, comprises: by a first metadata node, receiving read requests and write requests for metadata that is associated with a first range of keys within a set of keys, wherein the first metadata node comprises a first storage service node that executes a metadata subsystem of the distributed data storage system, wherein the set of keys are unique identifiers that ensure strong consistency within the distributed data storage system, wherein each key of the set is owned by exactly one metadata node in the distributed data storage system, wherein the first metadata node: owns the first range of keys, and stores and maintains first metadata files at the first storage service node, and wherein each first metadata file is associated with the first range of keys; by a second metadata node at a second storage service node that is distinct from the first storage service node, receiving read requests and write requests for metadata that is associated with a second range of keys within the set, wherein the second range is distinct from the first range, wherein the second metadata node: owns the second range of keys, and stores and maintains second metadata files at the second storage service node, wherein each second metadata file is associated with the second range of keys, and wherein the second metadata node comprises the second storage service node that executes the metadata subsystem of the distributed data storage system. The above-recited embodiment further comprising: executing a distributed barrier logic at one of the plurality of storage service nodes, wherein the distributed barrier logic controls a decommissioning of the second metadata node within the distributed data storage system without interrupting servicing of read requests from and write requests to any of the plurality of storage service nodes, wherein the decommissioning re-distributes ownership of the set of keys among metadata nodes in the distributed data storage system. The above-recited embodiment further comprising: after the decommissioning of the second metadata node is complete, by the first metadata node, receiving read requests and write requests for metadata associated with at least some keys in the second range of keys, wherein second metadata files associated with the at least some keys of the second range are stored at the first storage service node and maintained by the first metadata node; and wherein after the decommissioning of the second metadata node is complete, the second metadata node receives no read requests and no write requests within the distributed data storage system.

The above-recited embodiment, wherein a first instance of the distributed barrier logic is synchronized with other instances of the distributed barrier logic in the distributed data storage system, and wherein each instance of the distributed barrier logic executes in a pod subsystem that is distinct from the metadata subsystem that executes in the first metadata node and in the second metadata node. The above-recited embodiment, wherein during the decommissioning of the second metadata node, the first metadata node becomes owner of the at least some keys of the second range and the second metadata node no longer owns the keys in the second range of keys. The above-recited embodiment, wherein the distributed barrier logic controls the decommissioning of the second metadata node by applying a state machine to control a progression of operations at the first metadata node and at the second metadata node without causing interruptions to servicing of read requests and write requests addressed to metadata files associated with the second range. The above-recited embodiment, wherein the decommissioning of the second metadata node comprises copying the second metadata files associated with the at least some keys of the second range to the first metadata node, and wherein the copying is performed by anti-entropy logic that executes in at least the first metadata node.

The above-recited embodiment, wherein the decommissioning of the second metadata node within the distributed data storage system is completed when (i) all read requests addressed to metadata files associated with the at least some of the keys in the second range are served by the first metadata node and not by the second metadata node, and (ii) all write requests addressed to metadata files associated with the at least some of the keys in the second range are serviced by the first metadata node and not by the second metadata node. The above-recited embodiment, further comprising: after (i) all read requests addressed to metadata files associated with the at least some of the keys in the second range are served by the first metadata node and not by the second metadata node, and (ii) all write requests addressed to metadata files associated with the at least some of the keys in the second range are serviced by the first metadata node and not by the second metadata node: removing metadata files associated with the at least some of the keys in the second range from one or more of: the second metadata node and storage service nodes among the plurality that are not associated with the at least some of the keys in the second range. The above-recited embodiment, wherein after the decommissioning of the second metadata node is complete, a storage identifier that uniquely identifies the second metadata node in the distributed data storage system is permanently retired. The above-recited embodiment further comprising: re-commissioning the second metadata node, at the second storage service node, into the distributed data storage system with a new storage identifier that is distinct from the storage identifier used by the second metadata node being decommissioned. The above-recited embodiment, wherein the decommissioning of the second service node includes re-distributing second metadata files associated with the second range that are stored at other storage service nodes that are distinct from the first storage service node and the second storage service node. The above-recited embodiment, wherein payload data tracked by the second metadata files associated with the second range are not moved in the decommissioning.

According to yet one more example embodiment, a distributed data storage system comprising a plurality of storage service nodes, comprises: a first metadata node that is configured to receive read requests and write requests for metadata that is associated with a first range of keys within a set of keys, wherein the first metadata node comprises a first storage service node that executes a metadata subsystem of the distributed data storage system, wherein the set of keys are unique identifiers that ensure strong consistency within the distributed data storage system, wherein each key of the set is owned by exactly one metadata node in the distributed data storage system, wherein the first metadata node: owns the first range of keys, and stores and maintains first metadata files at the first storage service node, and wherein each first metadata file is associated with the first range of keys; a second metadata node at a second storage service node that is distinct from the first storage service node, which is configured to receive read requests and write requests for metadata that is associated with a second range of keys within the set, wherein the second range is distinct from the first range, wherein the second metadata node:

owns the second range of keys, and stores and maintains second metadata files at the second storage service node, wherein each second metadata file is associated with one of the keys in the second range of keys, and wherein the second metadata node comprises the second storage service node that executes the metadata subsystem of the distributed data storage system; at least one storage service node that executes a distributed barrier logic, wherein the distributed barrier logic is configured to control a decommissioning of the second metadata node within the distributed data storage system without interrupting servicing of read requests from and write requests to any of the plurality of storage service nodes, wherein the decommissioning re-distributes ownership of the set of keys among metadata nodes in the distributed data storage system; after the decommissioning of the second metadata node is complete, the first metadata node is further configured to: service read requests and write requests for metadata associated with at least some keys in the second range of keys, wherein second metadata files associated with the at least some keys of the second range are stored at the first storage service node and maintained by the first metadata node; and wherein after the decommissioning of the second metadata node is complete, the second metadata node is not authorized to process any read requests and any write requests within the distributed data storage system.

The above-recited embodiment, wherein during the decommissioning of the second metadata node, the first metadata node is configured to become owner of the at least some keys of the second range and the second metadata node no longer owns the keys in the second range of keys. The above-recited embodiment, wherein the distributed barrier logic is configured to control the decommissioning of the second metadata node by applying a state machine to control a progression of operations at the first metadata node and at the second metadata node without causing interruptions to servicing of read requests and write requests addressed to metadata files associated with the second range. The above-recited embodiment, wherein the decommissioning of the second metadata node comprises copying the second metadata files associated with the at least some keys of the second range to the first metadata node, and wherein the copying is performed by anti-entropy logic that executes in at least the first metadata node. The above-recited embodiment, wherein the decommissioning of the second metadata node within the distributed data storage system is completed when (i) all read requests addressed to metadata files associated with the at least some of the keys in the second range are served by the first metadata node and not by the second metadata node, and (ii) all write requests addressed to metadata files associated with the at least some of the keys in the second range are serviced by the first metadata node and not by the second metadata node. The above-recited embodiment, wherein after (i) all read requests addressed to metadata files associated with the at least some of the keys in the second range are served by the first metadata node and not by the second metadata node, and (ii) all write requests addressed to metadata files associated with the at least some of the keys in the second range are serviced by the first metadata node and not by the second metadata node: metadata files associated with the at least some of the keys in the second range are removed from one or more of: the second metadata node and storage service nodes among the plurality that are not associated with the at least some of the keys in the second range. The above-recited embodiment, wherein after the decommissioning of the second metadata node is complete, a storage identifier that uniquely identifies the second metadata node in the distributed data storage system is permanently retired. The above-recited embodiment, wherein the decommissioning of the second service node includes re-distributing second metadata files associated with the second range that are stored at other storage service nodes that are distinct from the first storage service node and the second storage service node. The above-recited embodiment, wherein payload data tracked by the second metadata files associated with the second range are not moved in the decommissioning.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Other Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system comprising:
a plurality of storage service nodes, wherein each key in a set of keys is owned by exactly one storage service node among the plurality of storage service nodes;
wherein among the plurality of storage service nodes, a first storage service node is configured to: own a first range of keys within the set of keys, receive read requests and write requests for metadata that is associated with the first range of keys, and store and maintain first metadata files at the first storage service node, wherein each first metadata file is associated with at least one key within the first range of keys;
wherein among the plurality of storage service nodes, at least one storage service node is configured to: control commissioning of a second storage service node into the system, wherein the commissioning is performed without interrupting servicing, by the system, of read requests from and write requests to any of the plurality of storage service nodes;
wherein the system further comprises the second storage service node, which is configured to: claim a second range of keys from the set of keys, wherein the second range of keys comprises at least part of the first range of keys; and wherein after the commissioning, the second storage service node is further configured to: receive read requests and write requests for metadata associated with the second range of keys, and store and maintain, at the second storage service node, any of the first metadata files that are associated with at least one key within the second range of keys.

2. The system of claim 1, wherein the commissioning of the second storage service node is initiated based on one or more of: detecting that the second storage service node has been activated, and detecting that the second storage service node claimed the second range of keys.

3. The system of claim 1, wherein before claiming the second range of keys from the set of keys, the second storage service node is activated without having metadata files associated with any key in the set of keys.

4. The system of claim 1, wherein during the commissioning, the second range of keys becomes owned by the second storage service node, and further wherein after the commissioning, the first storage service node no longer receives read requests and write requests for metadata associated with the second range of keys, and no longer maintains, at the first storage service node, the first metadata files that are associated with the at least one key within the second range of keys.

5. The system of claim 1, wherein the commissioning comprises a progression of operations that are configured to guarantee strong consistency within the system.

6. The system of claim 1, wherein the commissioning is based on a state machine that controls a progression of operations that are configured to guarantee strong consistency within the system.

7. The system of claim 1, wherein the set of keys are unique identifiers that are used for ensuring strong consistency of data and metadata within the system.

8. The system of claim 1, wherein the commissioning comprises re-distributing the set of keys among the second storage service node and one or more storage service nodes of the plurality of storage service nodes, including re-distributing the first range of keys between the first storage service node and the second storage service node.

9. The system of claim 1, wherein the first storage service node is configured to execute a first instance of a metadata subsystem, and wherein the second storage service node is configured to execute a second instance of the metadata subsystem, and wherein the commissioning comprises re-distributing the set of keys among storage service nodes that execute a respective instance of the metadata subsystem, including re-distributing the first range of keys between the first instance of the metadata subsystem and the second instance of the metadata subsystem.

10. The system of claim 1, wherein before the second storage service node is activated, the first storage service node operates according to a current view that indicates that the first range of keys is associated with the first storage service node, and wherein after the second storage service node is activated, the first storage service node acquires a new view that indicates that the second range of keys is associated with the second storage service node.

11. The system of claim 10, wherein the at least one storage service node is configured to: inform the first storage service node and the second storage service node that the first storage service node and the second storage service node have successfully completed copying any of the first metadata files that are associated with at least one key within the second range of keys from the first storage service node to the second storage service node, discard the current view, and establish the new view as the current view for the system, wherein establishment of the new view signifies completion of the commissioning of the second storage service node.

12. The system of claim 1, wherein the at least one storage service node is further configured to control decommissioning of the second storage service node from the system without interruption of read requests from and write requests to any of the plurality of storage service nodes, wherein the decommissioning re-distributes ownership of keys within the second range of keys to at least one other storage service node within the system that is distinct from the second storage service node; and wherein based on completion of the decommissioning, the second storage service node is not authorized to process any read requests and any write requests within the system.

13. A system comprising:

a plurality of storage service nodes, wherein each key in a set of keys is owned by exactly one storage service node among the plurality of storage service nodes;

wherein among the plurality of storage service nodes, a first storage service node is configured to: own a first range of keys within the set of keys, service read requests and write requests for metadata that is associated with the first range of keys, and store and maintain first metadata files at the first storage service node, wherein each first metadata file is associated with one or more key within the first range of keys;

wherein among the plurality of storage service nodes, at least one storage service node is configured to: control commissioning of a second storage service node into the system, wherein the commissioning is based on a state machine that controls a progression of operations, wherein the progression of operations enables the system to continue servicing read requests from and write requests to any of the plurality of storage service nodes, and wherein the progression of operations guarantees strong consistency within the system; and wherein the system further comprises the second storage service node, which is configured to: claim a second range of keys from the set of keys, wherein the second range of keys comprises at least part of the first range of keys;

wherein the commissioning comprises copying, from the first storage service node to the second storage service node, first metadata files that are associated with one or more keys within the second range of keys; and wherein after the commissioning, the second storage service node is further configured to: service read requests and write requests for metadata associated with the second range of keys, and store and maintain, at the second storage service node, the first metadata files that are associated with the one or more keys within the second range of keys.

14. The system of claim 13, wherein the commissioning of the second storage service node is initiated based on one or more of: detecting that the second storage service node has been activated, and detecting that the second storage service node claimed the second range of keys.

15. The system of claim 13, wherein before claiming the second range of keys from the set of keys, the second storage service node is activated without having metadata files associated with any key in the set of keys, and wherein during the commissioning, the second range of keys becomes owned by the second storage service node.

16. The system of claim 13, wherein after the commissioning, the first storage service node no longer services read requests and write requests for metadata associated with the second range of keys, and no longer maintains, at the first storage service node, the first metadata files that are associated with the one or more keys within the second range of keys.

17. The system of claim 13, wherein the commissioning comprises re-distributing the set of keys among the second storage service node and one or more storage service nodes of the plurality of storage service nodes, including re-distributing the first range of keys between the first storage service node and the second storage service node.

18. The system of claim 13, wherein the first storage service node is configured to execute a first instance of a metadata subsystem, and wherein the second storage service node is configured to execute a second instance of the metadata subsystem, and wherein the commissioning comprises re-distributing the set of keys among storage service nodes that execute a respective instance of the metadata subsystem, including re-distributing the first range of keys between the first instance of the metadata subsystem and the second instance of the metadata subsystem.

19. The system of claim 13, wherein before the second storage service node is activated, the first storage service node operates according to a current view that indicates that the first range of keys is associated with the first storage service node, and wherein after the second storage service node is activated, the first storage service node acquires a new view that indicates that the second range of keys is associated with the second storage service node;

wherein the at least one storage service node is configured to: inform the first storage service node and the second storage service node that the copying has been successfully completed, discard the current view, and establish the new view as the current view for the system, wherein establishment of the new view signifies completion of the commissioning of the second storage service node.

20. The system of claim 13, wherein the at least one storage service node is further configured to control decommissioning of the second storage service node from the system without interruption of read requests from and write requests to any of the plurality of storage service nodes, wherein the decommissioning re-distributes ownership of keys within the second range of keys to at least one other storage service node within the system that is distinct from the second storage service node; and wherein based on completion of the decommissioning, the second storage service node is not authorized to process any read requests and any write requests within the system.

\* \* \* \* \*